United States Patent
Grangetto et al.

(10) Patent No.: US 10,049,502 B2
(45) Date of Patent: Aug. 14, 2018

(54) METHOD AND DEVICE FOR EDGE SHAPE ENFORCEMENT FOR VISUAL ENHANCEMENT OF DEPTH IMAGE BASED RENDERING OF A THREE-DIMENSIONAL VIDEO STREAM

(71) Applicant: SISVEL TECHNOLOGY S.R.L., None (TO) (IT)

(72) Inventors: Marco Grangetto, Pinerolo (IT); Maurizio Lucenteforte, Turin (IT); Andrea Basso, Turin (IT); Giovanni Ballocca, Turin (IT); Muhammad Shahid Farid, Pinerolo (IT)

(73) Assignee: SISVEL TECHNOLOGY S.R.L., None (TO) (IT)

( * ) Notice: Subject to any disclaimer, the term of this patent is extended or adjusted under 35 U.S.C. 154(b) by 220 days.

(21) Appl. No.: 14/500,768

(22) Filed: Sep. 29, 2014

(65) Prior Publication Data
US 2015/0091899 A1 Apr. 2, 2015

(30) Foreign Application Priority Data

Sep. 30, 2013 (IT) .............................. TO2013A0784

(51) Int. Cl.
*G06T 5/00* (2006.01)
*G06T 19/20* (2011.01)
(Continued)

(52) U.S. Cl.
CPC .............. *G06T 19/20* (2013.01); *G06T 5/006* (2013.01); *H04N 13/0011* (2013.01);
(Continued)

(58) Field of Classification Search
None
See application file for complete search history.

(56) References Cited

U.S. PATENT DOCUMENTS

| | | | | |
|---|---|---|---|---|
| 6,215,841 B1 * | 4/2001 | Hsieh | ..................... | A61B 6/032 378/15 |
| 2011/0025827 A1 * | 2/2011 | Shpunt | .................. | G06T 7/0057 348/47 |

(Continued)

FOREIGN PATENT DOCUMENTS

| | | |
|---|---|---|
| CN | 101631256 A | 1/2010 |
| CN | 102724529 A | 10/2012 |
| DE | 10 2010 009 291 A1 | 8/2011 |

OTHER PUBLICATIONS

Devernay, Frédéric, and Adrian Ramos Peon. "Novel view synthesis for stereoscopic cinema: detecting and removing artifacts." Proceedings of the 1st international workshop on 3D video processing. ACM, 2010.*

(Continued)

*Primary Examiner* — Barry Drennan
*Assistant Examiner* — Schiller Hill
(74) *Attorney, Agent, or Firm* — Workman Nydegger

(57) ABSTRACT

A method for edge correction of images of a three-dimensional video content, the video content including at least one original view image and at least one depth or disparity map, the method including the following steps: detecting edges in at least one original view image for obtaining original edges; warping the original edges according to the depth or disparity map; detecting a set of warped edges altered by the warping process; and correcting the altered edges for obtaining corrected edges.

27 Claims, 15 Drawing Sheets

(51) Int. Cl.
G06T 15/20 (2011.01)
G06T 15/00 (2011.01)
H04N 13/128 (2018.01)
H04N 13/00 (2018.01)

(52) U.S. Cl.
CPC ....... *H04N 13/0022* (2013.01); *H04N 13/128* (2018.05); *G06T 2200/04* (2013.01); *G06T 2207/10021* (2013.01); *G06T 2207/10028* (2013.01); *G06T 2207/20192* (2013.01); *G06T 2219/2021* (2013.01); *H04N 2013/0081* (2013.01)

(56) References Cited

U.S. PATENT DOCUMENTS

| | | | |
|---|---|---|---|
| 2013/0076749 A1 | 3/2013 | Maeda et al. | |
| 2013/0106848 A1* | 5/2013 | Nguyen | H04N 13/0011 345/419 |
| 2013/0135720 A1 | 5/2013 | Naske et al. | |
| 2013/0147804 A1 | 6/2013 | Naske et al. | |

OTHER PUBLICATIONS

Wei, Chen-Hao, et al. "Novel multi-view synthesis from a stereo image pair for 3d display on mobile phone." Asian Conference on Computer Vision. Springer Berlin Heidelberg, 2012.*

Tsai, Tsung-Yuan, et al. "A volumetric model-based 2D to 3D registration method for measuring kinematics of natural knees with single-plane fluoroscopy." Medical physics 37.3 (2010): 1273-1284.*

Wan-Yu Chen et al., *Efficient Depth Image Based Rendering With Edge Dependent Depth Filter and Interpolation*, 2005 IEEE International Conference on Multimedia and Expo, Jan. 1, 2005, pp. 1314-1317.

Muhammad Shahid Farid et al., *Edges Shape Enforcement for Visual Enhancement of Depth Image Based Rendering*, 2013 IEEE 15th International Workshop on Multimedia signal Processing, Sep. 1, 2013, pp. 406-411.

Italian Search Report dated Jul. 9, 2014, issued in Italian Application No. TO20130784, filed Sep. 30, 2013.

* cited by examiner

METHOD AND DEVICE FOR EDGE SHAPE ENFORCEMENT FOR VISUAL ENHANCEMENT OF DEPTH IMAGE BASED RENDERING OF A THREE-DIMENSIONAL VIDEO STREAM

CROSS-REFERENCE TO RELATED APPLICATIONS

This application claims priority to Italian Application No. TO2013A000784, filed Sep. 30, 2013, which is incorporated herein.

DESCRIPTION

Field of the Invention

The present invention refers to a method and device for edges shape enforcement for visual enhancement of depth image based rendering of a three-dimensional video stream.

Description of the Prior Art

The recent advances in 3D display technologies come along with a number of technical challenges for the success of 3D TV. Various techniques have been proposed for efficient coding, transmission and rendering. Due to the constraints on the data rate available to transmit multiple views, only few original views can be delivered with their depths and the other intermediate views are generated from the available views and their depths using depth image based rendering (DIBR) techniques. Commonly, two or three views and their corresponding depths are used to render intermediate views. The goal of any DIBR techniques is to achieve high visual quality in virtual views. This is challenging task when the depths are inaccurate because of estimation or measurements errors, quantization and/or lossy compression.

Almost all view synthesis techniques operate in two phases: first, the original views are warped and fused together to generate an intermediate view; then, missing regions in the intermediate view are recovered by various inpainting methods. The new position of each pixel depends on its depth and camera parameters. A small error in depth may cause a large variation in the final position of the pixel. The second phase in view synthesis is known as hole filling or inpainting.

The most typical case is the generation of an intermediate view in between two original views, namely left and right views accompanied by the corresponding depth maps.

Let $V_l$ and $V_r$ be the two input views with corresponding depths $D_l$, $D_r$ which are quantized into 8 bit integers. Let $Z_n$ and $Z_f$ be the nearest and farthest depth respectively. The most common setting is horizontal cameras setup with camera focal length f, where $b_l$, $b_r$ are the positions of the left and the right camera, respectively. Usually, $b=b_r-b_l$ is referred to as the cameras baseline. Let $V_m$ be the intermediate virtual view that one is willing to estimate. The position of the virtual camera for $V_m$ would be $$b_m = b_l + \frac{b}{2} = b_r - \frac{b}{2}.$$

In order to generate $V_m$, the pixels of left view are warped to the target intermediate virtual camera; similarly, the right view is warped to the intermediate view. Then the two obtained virtual views are merged to get the final virtual view. The two intermediate views usually complement each other and allow to fill most occlusions. Let $V_l'$ be the left virtual view. Because of the horizontal camera arrangement $V_l'$ is obtained from $V_l$ by applying horizontal shifts to pixel coordinates. Given pixel position (u, v)∈$V_l$, the warped position (u', v')∈$V_l'$ is such that u'=u and v'=v−δ. The column shift δ is computed as:

$$\delta = \frac{bf}{2d}$$

where d is the depth of the original pixel with coordinates (u, v).

Depths are generally provided in the form of quantized disparity (i.e., inverse depth). We use notation $D_l$ ($D_r$) to identify such quantized depth maps. The actual depth can be computed as follows:

$$d = \frac{1}{\frac{D_l}{255}\left(\frac{1}{Z_n} - \frac{1}{Z_f}\right) + \frac{1}{Z_f}}$$

Similarly, the right virtual view $V_r'$ is computed (for right virtual view δ is added to the original column number to get the warped position). Finally, the two virtual views are merged together to get the intermediate view $V_m$ and the holes are recovered by some inpainting algorithm.

DIBR techniques are able to produce intermediate views that are generally affected by some evident artifacts due to a number of issues, e.g. rectification errors, imperfect color correction and miscalculated depth information.

Therefore there is a need to improve the image quality of intermediate views of a three-dimensional video stream by detecting and correcting errors or inaccuracies in depth or disparity information.

SUMMARY OF THE INVENTION

Therefore it is the main object of the present invention to provide a method and device for edges shape enforcement for visual enhancement of depth image based rendering of a three-dimensional video stream, which overcomes the above problems/drawbacks.

Depth information is generally estimated by means of algorithms based on stereo matching of corresponding points in several views. It has been found that this process is an ill posed problem and therefore some estimation errors are to be taken into account. In other cases depth or disparity can be measured by sensors, e.g. laser based time of flight. Depth information is usually inaccurate along the edges of the objects due to poor estimation, measurements and compression artifacts; as a consequence the DIBR warping process often destroys the boundaries of the objects, resulting in poor visual quality in the virtual view.

Therefore the primary goal of the present invention is to improve the image quality of intermediate views by detecting and correcting depth or disparity information in the depth or disparity maps of stereoscopic images (or video streams).

It is per se known that there is a biunivocal relationship between depth map and disparity map in stereoscopic video streams, therefore in the following it is to be understood that the scope of the invention is extended to cover both kinds of maps. The term "map" will be used to identify both depth and disparity map.

The goal of this invention is to improve the performance of DIBR based on
either correction of the intermediate view synthesis process on the receiver side
or correction of the depth or disparity maps before transmission.

Moreover a set of metric for evaluating the warping error along edges is introduced and can be profitably used for quality evaluation multi view plus depth contents.

All this objectives are achieved exploiting prior knowledge of the edges shape.

To achieve this goal, the object of the invention is a technique that first finds the edges that undergo significant warping error and then applies the correction to those edges. Indeed, the corrections may be applied in two modes; correcting the corresponding erroneous depths (on the transmitter side before the delivery of the depth or disparity maps so as to guarantee better DIBR performance at the receiver) or applying the corrections on the virtual view at the receiver side while performing DIBR or as postprocessing before sending the image to the display. In both cases, we exploit the prior knowledge that straight lines and edges are preserved under typical transformations (i.e., perspective transformations).

The proposed solution enforces the knowledge that object contours are expected to exhibit approximately the same shape in the original (left or right view) and intermediate views.

As an example straight lines are invariant under perspective transformation and therefore one knows that straight lines in the left view must be re-projected as straight lines in the warped image.

Similarly, a general edge must be warped without changing significantly its shape. By means of this a priori knowledge and re-projection the error in reproducing the original edge shape is minimized.

Finally, the proposed metrics for capturing warping errors along edges can be used as building block for system and apparatus able to evaluate the quality of depth (or disparity) maps to be used for view synthesis and interpolation.

Therefore the basic idea of the invention is to correct the edges of the views synthesized in a 3D video system of reconstruction of intermediate views, obtained starting from the original views and/or from relating depth maps, using an edge detection algorithm that acts on the original view and/or on the depth maps.

In the synthesis techniques of intermediate views in a multi-view or autostereoscopic 3D display system, the accuracy of the depth maps used is very important.

Particularly important are precision and accuracy with which the depth values of the edges of the images are reported, that contribute greatly to the quality perceived by the viewer, which is affected by their artifacts.

In particular, it is necessary to avoid any kind of distortion that alters the continuity and connectivity of the edges of the images.

The technical solution subject of the invention strongly improves the quality (continuity and connectivity) of the edges in the synthesized view or in the depth maps used to synthesize the views, and contributes decisively to improve the overall quality of the synthesized three-dimensional images.

The correction technique can be used:
in the reconstruction phase of the three-dimensional video stream, to correct depth maps associated with the original views or the synthesized views and eventually decoded;
before formatting and possible encoding of the three-dimensional video stream.

Here in the following some non-limiting examples of embodiments of the invention are summarized relating to the method of correction in the reconstruction phase. These examples will be described in details in the paragraph of the detailed description of the preferred embodiments.

According to the first embodiment solution, as for example described below in § 1, the edges are corrected directly in the synthesized view of the reconstructed three-dimensional video stream. Because the edges are often degraded due to noise or errors in the estimated depth maps associated with the original views, the edges must be corrected. When this correction is made during the reconstruction, the operation is carried out starting from the received view/views, and from the corresponding depth maps, which can be received in a compressed form (e.g., coded according to the AVC or HEVC standard) or non-compressed form.

The first processing involves the application of algorithms for the detection and extraction of the edges (known per se, for example, the Sobel one) on the original starting view received and reconstructed (decoded).

The set of edges obtained from the original view is optionally subjected to further processing, as for example described below in § 1.1, in which the most significant edges are selected (according to predefined criteria, for example, the longest edges, straight, oriented in a certain direction, closest to the viewpoint, etc.) and or are segmented the longest ones are segmented, as sequences of straight segments.

The set of one or more criteria applied depends on the desired balance between the visual quality and the desired additional computational complexity introduced.

All edges, or only selected ones and or preprocessed ones, are projected by using the depth map associated to the starting view, so as to derive the positions of the same edges in the synthesized image. These projected edges (subject to "warping"), or more precisely the positions of the pixels that compose them, are then compared with the corresponding positions of the pixels of the original view received and reconstructed.

In case of discrepancy between the positions of the edge pixels, the pixels belonging to the edges detected and extracted from the original view are used to correct the position of the projected edge pixels.

To perform the correction it is necessary to decide which edges are altered, using a method of measurement of the error that appears in the edges represented in the depth map, as for example described below in § 1.2.

Two methods are described as examples of how to detect the level of discrepancy between projected edges according to the depth map, and those derived from the view image.

The first method, as for example described below in § 1.2.1, is based on a comparison between the shapes of the corresponding edges in the two images: the coordinates of a representative point of the overall shape of the edge are calculated for each significant edge, as for example its center of gravity or its median point; the coordinates of the pixels of the edges of the map and the projected view are normalized with respect to its representative point. The error is a function of the difference between the normalized coordinates of the position of each pixel of the original edge, and the position of the pixels of the corresponding edge. To get an overall measure of the error over the entire edge, it is possible to combine appropriately the resulting values, considering for example the sum of the modules of the errors of along all the edge.

The second method, as for example described below in § 1.2.2, is based on the detection of anomalies in the trajectory of the projected edges compared to those extracted from the original view. If, for each pixel belonging to the projected edge, it is detected a local deviation, for example, with the gradient, with respect to the edge of the original view, an error is assumed in the depth map that must be corrected.

An example consists in the calculation of the module of the ratio between the difference of the horizontal and vertical coordinates: when the value is greater than 1, it is assumed that the position of the projected pixels is wrong.

With reference to FIG. 9, an example is shown of discontinuous edge $\tilde{e}_j$ of the i-th pixel with horizontal and vertical gradient in modulus >1.

More generally, the gradients of the corresponding pixels of the homologous edges of the view and of those projected according to the depth map are calculated, and their values are compared: the pixels having a gradient difference that satisfies a certain requirement (for example, exceed a threshold value) are corrected.

Even in this case a measure can be obtained of the overall error of the edge, starting from that of the pixel composing it, for example by summing by module the related gradients. In this way it is possible to determine which edges have been altered significantly and so it is appropriate to correct them.

Once the pixels of the edges and/or the altered edges of the depth map are detected, their correction can be made, based on the edges of the original view, as for example described below in § 1.3.

Three possible correction techniques can be applied as non-limiting examples.

The first correction technique, as for example described below in § 1.3.1, provides for calculating the new position of the pixels of the projected edge, by subtracting from the coordinates of each pixel the error value calculated by applying a method of comparison between the edges, as for example described below in § 1.2.1. To limit the computational cost resulting from this technique, the correction can be limited to only the edges whose total error exceeds a predetermined threshold.

The second correction technique is based on the application of a local operator for the timely correction of the edges, e.g., based on a measure of gradient, as for example described below in § 1.2.2.

The third technique involves a correction based on a function dependent on the values of the gradient of the edge of the original view of the nearby pixels to be corrected. In particular, it is possible to correct a pixel of the edge by applying a function of the sum of the coordinates of the previous pixel with the value of the gradient calculated in correspondence of the corresponding pixels of the projected edge.

A video image does not involve only boundaries: it contains also the colors, its shades and textures that characterize areas of the image separated by an edge. The displacement of the altered edges can cause visual artifacts due to the discontinuity introduced in adjacent areas that may be coherent with the trend of the edge before correction, as for example depicted in FIG. 10.

To preserve the consistency of the corrected synthesized images (provided by a combination of correct depth map and corresponding original view), in the vicinity of the moved edges based on the correction in the operation of correction, it is possible to correct, along with the recalculated pixels of the edge, even some of the surrounding pixels, as for example described below in § 1.4, and depicted in FIG. 11.

This technique is called "edge enforcement". Instead of defining a surrounding region to be corrected having sharp boundaries (as shown by way of example and schematically in FIG. 11), the pixels adjacent to the corrected edge can be melted in the synthesized view according to a weighting function which depends on the distance of the pixels from the nearby edge.

The correction technique can be applied to a single view and related depth map, or to two or more views and related (depth or disparity) maps.

In case of application of the method to the original views of the three-dimensional video stream, as usual, the edges of one view are warped according to the relevant depth map and the warped ones are compared with the edges previously detected in the other view of the stereoscopic pair (as for example described below in § 2.2). The edge correction in the synthesized (warped) view is performed by comparison of the altered warped edges and those detected in the other view, for example by computing their difference in position. A similar approach is possible if the correction technique is used on the depth maps.

In another embodiment of the invention, it is possible to combine the technique of correction applicable to the two maps in different ways:

Each synthesized view or map is corrected independently according to its corresponding view;

The incorrect edges in one view or corresponding map are corrected in the other view;

The correctable edges based on both views are corrected using those edges of the view that meet a predetermined criterion, for example, those that give the lower projection error according to the error metrics available. Obviously, edges present in a single view (absent in the other for example due to occlusion) can be corrected only from a single view.

In case of three-dimensional content of the video stream having more than two (original) views it is possible to apply any of the above edge correction methods by applying it repeatedly to different pairs of the available views or relevant depth (or disparity) maps.

Here in the following some non-limiting examples of embodiments of the invention, relating to the correction method in the phase of content preparation or generation of the three-dimensional video stream are summarized. These examples will be described in details in the paragraph of the description of the preferred embodiments.

The correction of the depth maps can also be performed in the phase of preparation or generation of the three-dimensional video content. In this case, not the position of the pixels of the edges is to be corrected, but instead the depth value represented in the corresponding depth map. In particular, the shift of the correct edges (also called disparity) is calculated. From this the corresponding correct depth value is obtained by using the known relationship between the depth and shift values Therefore the first step is obtaining the correct edges. This happens in a similar way as described for the correction technique in the reconstruction phase.

First of all the edges of the original view (corrector edges) are detected with any known technique. These are projected in the intermediate view using the related depth map, as described for the previous correction technique. At the same time, however, the map of the shifts of the pixel edges is calculated (obtained in known manner from knowledge of the corresponding depth values). This shift is added to the horizontal coordinate of the edge to derive the position of the projected edge.

Then the projection error along edges, i.e., the difference between the projected edges and the correct ones is calculated, and after the correct shift map is calculated as the difference between the shift of the original edge and the error defined above. At this point, the depth map value are corrected, by using for each pixel of the edges the formula that relates depth and displacement or disparity.

The correction of the depth values of edges alone involves the possible creation of artifacts in the map, in a similar way as what happens in the synthesized view. Similarly, to eliminate these artifacts a method can be employed similar to edge enforcement, as described above.

This second correction technique applicable in the preparation or generation process can be directly used in the case of a single view and relative depth map. When two or more views with the relative depth maps are involved, it is possible to coordinate in various ways the steps of the second correction technique which can be used for each pair view depth map of the 3D video content. For example, for the phase of detection and selection of edges, as for example described below in § 1.2.1, stereo matching tools can be used to find correspondence between pair of edges in the two depth maps, (right and left), and then select the edges to be corrected according to one of the criteria, as for example described below in § 1.1. Once the correspondence of an edge in the two maps is established, the proposed error metric can be defined between the projected edge and the corresponding edge in one original view.

Another aspect of the invention relates to the possible use of a quality metrics as a quality assessment tool for the depth or disparity maps of the three-dimensional video stream.

The known objective indicators of the image quality (e.g., PSNR, SSIM and VQA) cannot always be used for the estimation of the quality of the depth maps. Since the quality of the edges contributes significantly to the subjective quality of the synthesized images, functions obtained by measuring the error of the projected edges, as for example described below in § 1.2.1 and § 1.2.2, may be used as indicators of the quality of depth maps. In particular, it is possible to define two versions of such metrics.

The first metric, called "Absolute Edge Warping (AWE) error metric" is based on the projection of the edges of the original view and measure the projection error caused by depth map values, by comparing the position of the edge before and after projection, as for example described below in § 1.2.1.

It is possible to get an overall measure of the quality of the depth map associated with the view in a certain time instant by evaluating functions of the error defined at edge pixel level, as an example computing mean square error, maximum value or any other standard statistical measure. Of course it is also possible to select for the measurement only a subset of the edges, chosen according to one of the criteria as for example described below in § 1.1.

The proposed metric can be biased by large errors in very short edges, that on the contrary are barely visible by the human visual system and therefore do not degrade the subjective quality. Therefore, a second metric, weighted with respect to the length of the edges, is proposed: the error of each edge is weighted with a function that assigns a higher weight to the longer edges; the edge lengths are estimated with any known technique (for example, considering the number of pixels that compose it).

An object of the present invention is a first method for edge correction of images of a three-dimensional video content, said video content comprising at least one original view image and at least one depth or disparity map, the method comprising the following steps: detecting edges in said at least one original view image for obtaining original edges; warping said original edges according to said depth or disparity map; detecting a set of warped edges altered by the warping process; correcting said altered edges for obtaining corrected edges.

Preferably the method comprises the further step of obtaining corrected images of said three-dimensional video content, by applying said corrected edges on the images of said video content.

Another object of the present invention is a method for edge correction of images of a three-dimensional video content, said video content comprising at least two original view images and at least two depth or disparity maps, the process comprising: performing the first method to one of said at least two original views; performing the first method to the other of said at least two original views, wherein said method is performed on said original views consecutively one after the other and independently from each other.

A further object of the present invention is a method for edge correction of images of a three-dimensional video content, said video content comprising at least two original view images and at least two depth or disparity maps, the process comprising: performing the first method to one of said at least two original views; performing the first method to the edges of the other original view that have not been corrected during the preceding step.

A further object of the present invention is a method for edge correction of images of a three-dimensional video content, said video content comprising at least two original view images and at least two depth or disparity maps, the process comprising: determining which edges of said three-dimensional video content can be corrected applying the first method to both said two original view images, and applying the first method to the edges determined during the previous step.

Further objects of the present invention are a method for assessing the quality of a depth map corresponding to an original view related to a three-dimensional video content, as described in the claims herein.

Further objects of the present invention are Video processing apparatus as described in the claims herein, or Video quality assessment apparatus as described in the claims herein.

Further objects of the present invention are a system for the reconstruction of a three-dimensional video content, as described in the claims herein, and a system for the generation of a three-dimensional video content, as described in the claims herein.

These and further objects are achieved by means of a method and device for edges shape enforcement for visual enhancement of depth image based rendering of a three-dimensional video stream, as described in the attached claims, which form an integral part of the present description.

BRIEF DESCRIPTION OF THE DRAWINGS

The invention will become fully clear from the following detailed description, given by way of a mere exemplifying and non-limiting example, to be read with reference to the attached drawing figures, wherein:

FIGS. 1 a-h show examples of edge error detection and correction using 'Shape Matching' technique, more in particular:

FIG. 2a Original edge $e_j$;
FIG. 2b Warped edge $\tilde{e}_j$;
FIG. 2c Gradient of original edge;
FIG. 2d Gradient of warped edge;
FIG. 2e Corrected warped edge $\hat{e}_j$;
FIG. 2f Original edge (upper curve) and corrected warped edge (lower curve);

FIG. 5a: edges extracted from left view;
FIG. 5b: warped image with altered edges;
FIG. 5c: warped image with corrected edge locations;

DETAILED DESCRIPTION OF THE PREFERRED EMBODIMENTS

Figure 1B:
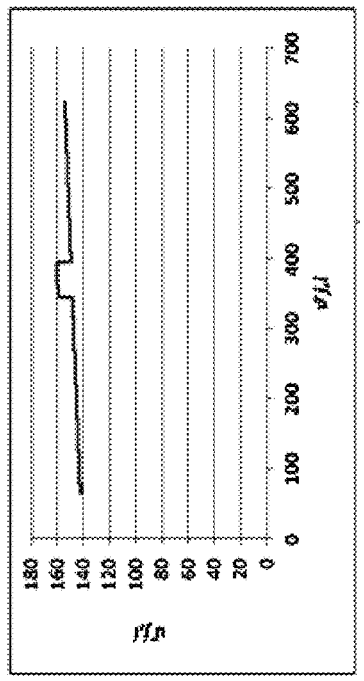
FIG. 1b Warped edge $\tilde{e}_j$; centroid $c_j$=(344.5,148.5)

In the following some variants of embodiment of the basic idea of the method of the invention are described.

1 Receiver-Side Corrections

At the receiver side (or reconstruction side) of the three-dimensional video stream (system), the goal is to improve the visual quality of objects in the virtual images created using the received views and the corresponding disparity or depth information. In most cases the received views and depth will be affected by compression errors as a consequence of lossy compression algorithms.

The proposed technique comprises two phases.

In the first phase, boundaries (edges) of the objects are detected in at least one view, e.g., the left picture. Next, the detected edges are warped to their intermediate position allowing the detection of the set of edges altered by the warping process. In the second phase, the correction is applied to the warped image.

1.1 Edges Detection and Pre-Processing

The first task in the proposed technique is to identify the edges in the input content (i.e., content views and/or corresponding depth/disparity maps). Edge detection can be performed either on the content views or the corresponding depth or disparity map. We recall that, since depth maps may not be accurate, it is usually better to detect the edges using the original views and not the corresponding depth. The process is initiated with any known edge detection algorithm. A number of techniques exist to detect the edges in pictures like simple and fast Sobel and Prewitt kernels and the more complex Canny edge detector as for example described in the article by J. Canny, "A computational approach to edge detection," *IEEE Trans. Pattern Anal. Mach. Intell.*, vol. 8, no. 6, pp. 679-698, June 1986. The following steps will work on the obtained set of edges.

The set of edges can be ordered and/or limited in size to scale algorithm complexity, and/or pre-processed according to a combination of at least one of the criteria including:

quality criteria that need to be achieved within the whole correction process (i.e., visual quality, specific properties of the visual objects, geometrical properties, application specific constraints)

geometrical features of the edge (e.g., based on orientation, linearity, curvature, length)

edge position based (e.g., position in 3D space, closeness to the camera viewpoint)

edges can be split into straight segments (possibly generating a piecewise linear edge) so as to apply the subsequent corrections only to straight lines, a case where the correction is known to be theoretically optimal, since straight lines are invariant under projective transformation any selection criterion able to tradeoff final quality of the whole correction process and algorithm complexity (this latter depends on the number of edges that need to be corrected), e.g., the edges in the set are first ordered based on at least one of the previous criteria, and then a subset of them is selected for correction.

This pre-processing can be achieved by employing known edge detection tools by properly tuning their parameters, e.g., filtering, thresholds, etc. followed by proper classification and ordering tools, both supervised or unsupervised. This process achieves optimal criterion satisfaction and complexity tradeoff.

Let E be the set of selected edges, where $e_j$ denotes the j-th edge in the set possibly according to the ordering criteria mentioned earlier.

Let $e_j(i)=(u_{j,i}, v_{j,i})$ be the i-th point of the j-th edge with coordinates $(u_{j,i}, v_{j,i})$ in the image plane and the number of points of the edge be $n_j$. In other words, $e_j(i)$ can be represented as vector of $n_j$ coordinates.

The edge list E is then transformed into the warped edge set $\tilde{E}$ by applying warping towards a target viewpoint, e.g., a viewpoint between two available views, or any convenient viewpoint if only a view is available. Warping depends on the depth/disparity map and it is applied to the corresponding edge coordinates, as explained above.

Figure 1D:
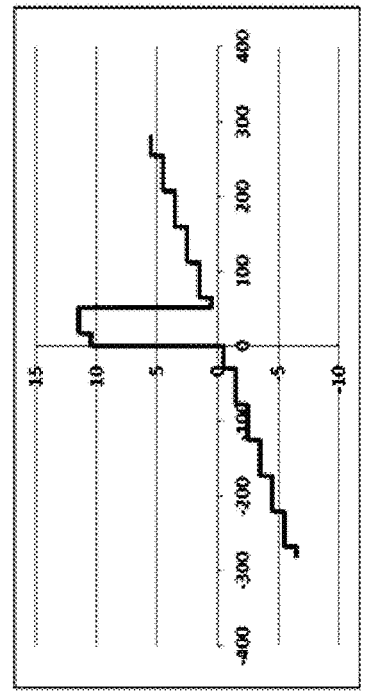
FIG. 1d Warped referenced edge $\tilde{e}_j^r(i)$.
Figure 1A:
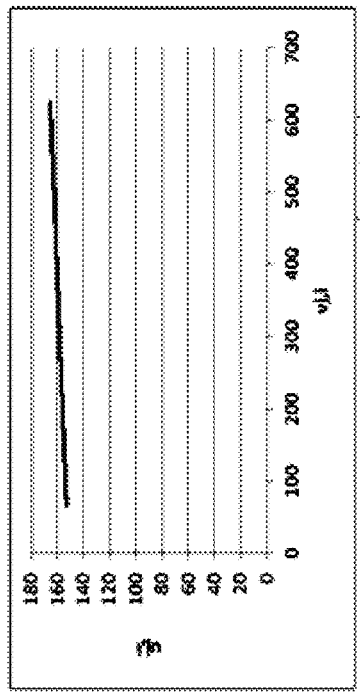
FIG. 1a Original edge $e_j$; centroid $c_j$=(344.5,159)

Therefore any error in the depth/disparity value at edge coordinates will be reflected in the computed warped edge. In FIG. 1a we show an example of an original edge $e_j$ and the corresponding warped edge $\tilde{e}_j$ that has been affected by warping errors (see the anomalous deformation in the middle of the edge).

1.2 Warping Error Estimation on Edges

The warping process, due to errors in the depth/disparity map values, potentially introduces errors and distorts the edges. The proposed algorithm detects the edges altered by depth errors, and corrects them.

We propose two methods to detect the altered edges;
a first one based on edge shape matching (pre and post warping) and
a second one based on anomaly detection on warped edge coordinates.

1.2.1 Edge Shape Matching

The first method to estimate the warping error and detect the altered edge is based on comparing the shape of one original edge and the corresponding warped edge.

Let $e_j$ be an original edge and $\tilde{e}_j$ be the corresponding warped edge.

To determine the distortion in the warped edge with respect to the original edge, the centroid of both edges is computed.

Let $c_j \triangleq (u_j^c, v_j^c)$ be centroid of original edge $e_j$ and $\tilde{c}_j \triangleq (\tilde{u}_j^c, \tilde{v}_j^c)$ be the center of the warped $\tilde{e}_j$ edge. The centroids are computed as follows:

$$(u_j^c, v_j^c) = \left(\frac{u_1 + u_2 + u_3 + \ldots + u_{n_j}}{n_j}, \frac{v_1 + v_2 + v_3 + \ldots + v_{n_j}}{n_j}\right)$$

The centroid of $\tilde{e}_j$ is computed analogously. FIG. 1a and FIG. 1b reports the values of centroid for a sample edge.

Alternatively the centroid can be substituted by any other reference point computed as a function of the edge points as an example using the median on the horizontal and vertical coordinates.

The median has the well-known feature of being more robust to outliers in the value of the warped edge coordinates. Other statistical operators can be used for the same purpose.

Figure 1C:
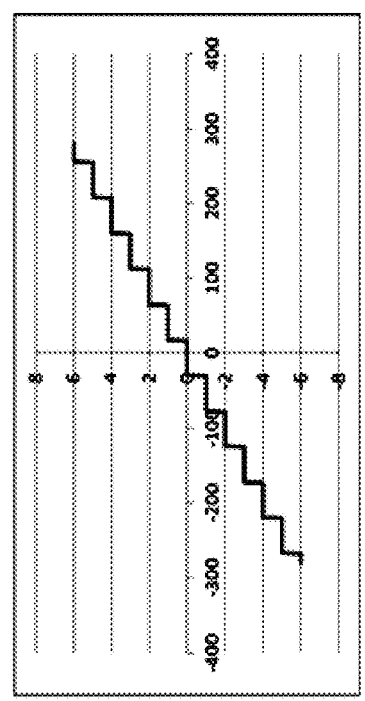
FIG. 1c Original referenced edge $e_j^r(i)$.

To match the shape of the two edges their respective coordinates are remapped to the respective centroids as follows:

$$e_j^r(i) = e_j(i) - c_j$$

$$\tilde{e}_j^r(i) = \tilde{e}_j(i) - \tilde{c}_j$$

yielding what we termed the referenced edges $e_j^r$ and $\tilde{e}_j^r$. An example of referenced edge is shown in FIG. 1c and FIG. 1d.

The warping error for each point i of the j-th edge is computed by taking the difference between the coordinates of the referenced edge points as follows:

$$\psi_j(i) = e_j^r(i) - \tilde{e}_j^r(i)$$

Figure 1E:
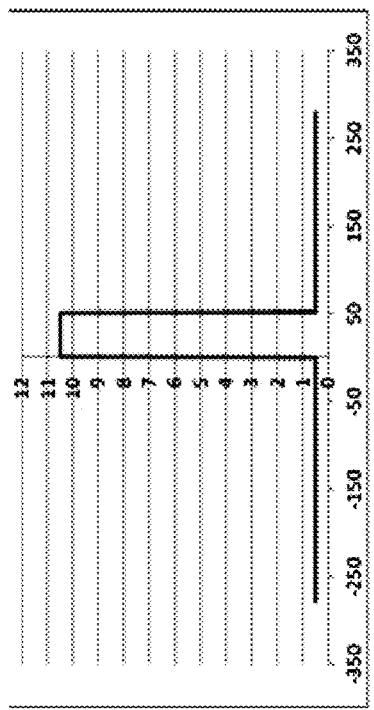
FIG. 1e Overlapped referenced edges from (c) and (d)
Figure 1F:
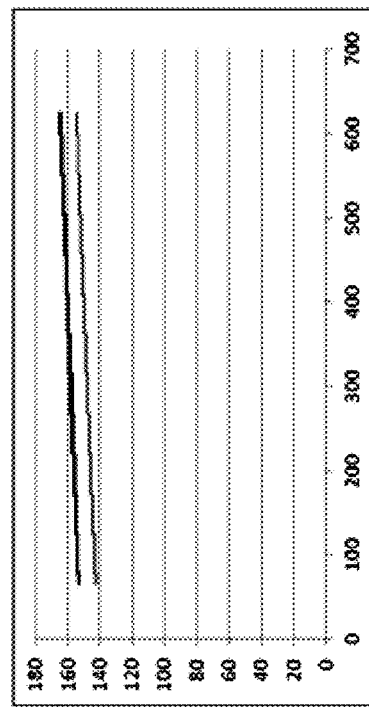
FIG. 1f Edge error $\psi_j$.
Figure 1G:
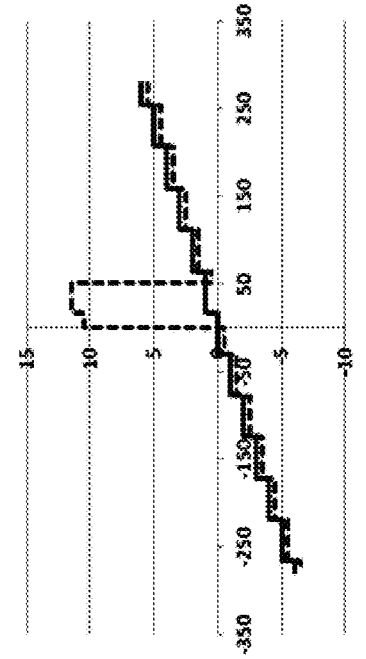
FIG. 1g Corrected warped edge $\hat{e}_j$.

The values of $\psi_j$ computed in the case of the sample edge used in FIGS. 1a-1h are shown in FIG. 1f. It can be noted that high values of $\psi_j$ correspond to the part where warping has damaged the edge.

It is also possible to define an overall warping error $\mu_j$ of the j-th edge for instance by summing the module of all edge point errors as $$\mu_j = \sum_i |\psi_j(i)|$$

Alternatively an average of all the edge error points can be taken. Furthermore, any other suitable function of the $\psi_j(i)$ defined above can be used as metric for the whole warping error on the j-th edge.

1.2.2 Warped Edge Anomaly Detection

Another method to detect warping error in the edges is based on the analysis of the shape of the edge trajectories before and after warping looking for anomalous, generally abrupt, modifications.

This goal can be achieved with any anomaly detection method known in the literature.

As an example, altered edges can be detected by analyzing the gradient of edges before and after warping as shown in FIGS. 2a to 2f.

Indeed the gradient represents the horizontal and vertical increments of the edge trajectory. Where the gradient of an edge after warping turns out to be significantly different from the original edge we assume that it undergoes an anomalous warping due to wrong depth information.

Given an edge point $e_j(i)$ its gradient $\nabla_j(i)$ is defined as:

$$\nabla_j(i) = (\nabla_j^r(i), \nabla_j^c(i)) = e_j(i) - e_j(i+1)$$

Similarly, $\tilde{\nabla}_j(i)$ is computed for the warped edge point $\tilde{e}_j(i)$. Before warping, edges are formed by connected points by construction and therefore it must hold that $|\nabla_j^r(i)| \le 1$ and $|\nabla_j^c(i)| \le 1$ i.e., horizontal and vertical coordinates of two consecutive edge points must be in adjacent positions.

Any alternative connectivity test known in computer vision literature can be used to this end.

It can be observed that, for limited values of the camera baseline b, edges are characterized by similar gradients before and after warping. On the contrary, non-correct warping significantly modifies the edge gradient and some edge points are no longer connected.

To detect anomalous edge warping we compute the gradient difference $\tilde{\nabla}(i) - \nabla_j(i)$. If one assumes horizontal camera setting the warping does not change the row index u and the gradient difference simplifies as follows:

$$\tilde{\nabla}_j^r(i) - \nabla_j^r(i) = 0$$

$$\tilde{\nabla}_j^c(i) - \nabla_j^c(i) = \tilde{v}_{j,i} - \tilde{v}_{j,i+1} - \tilde{v}_{j,i} + \tilde{v}_{j,i+1}$$

As for previous error metric also in this case it is possible to define an overall warping edge error metric.

For instance, the sum of absolute difference of the horizontal gradient before and after warping $\mu_j = \Sigma_i |\tilde{\nabla}_j^c(i) - \nabla_j^c(i)|$ can be defined as the overall edge error and can be used as a metric to detect an altered edge.

Other similar average operator and function of the gradient error may be used as alternatives.

Based on this error metric, all or a subset of edges may be selected for correction. As an example, in FIG. 2d the metric $\mu_j$ is reported for a frame of the Poznan_Hall2 test sequence and shows that only a few edges exhibit large values making them candidate for correction. Once the j-th edge is classified as altered, it is necessary to locate the points that actually require correction.

Based on previous observations on the edge gradient a point of the warped edge is considered in error if the magnitude of horizontal component of the gradient of the i-th point is larger than 1, $|\tilde{V}_j^c(i)|>1$, i.e., the warped edge looks disconnected around the i-th point.

1.3 Edge Correction

Once the edges that are 'miswarped' during the warping process are detected, countermeasures can be applied during the correction phase. Three alternative correction strategies are described in the following.

1.3.1 Correction by Shape Matching

This correction method is related to the metric we termed Edge Shape Matching and uses the error $\psi_j(i)$ defined in Sect. 1.2.1 to correct the shape of the warped edges.

Clearly, this method can be applied also in the case other warping error metrics are employed for edge detection with the only drawback that the adopted error metric is not reused in the correction phase; this would generally incur a higher computational cost.

The correction in case of shape matching is performed by subtracting the edge error from the warped edge to enforce the shape of the original edge.

According to this solution the corrected edge $\hat{e}_j$ is computed as:

$$\hat{e}_j(i) = \tilde{e}_j(i) - \psi(i)$$

FIG. 1e and FIG. 1f graphically show the effect of such correction on a sample edge.

To limit the computational cost the correction can be applied only to those edges whose overall error $\mu_j$ is above a given threshold $\gamma$. The threshold $\gamma$ for selection of altered edges can be any positive number greater than 0. Our experiments show that setting $\gamma>10$ usually yield good results. However, if $\gamma$ is fixed to 0, i.e., applying the correction to all the edges of the image, the proposed method still works maintaining the exact shape of the correctly warped edges and correcting only the "miswarped" edges; indeed, the correction term in previous equation is likely to be very close to 0 for edges that are already correctly warped and will not modify the shape of such edges.

Figure 10:
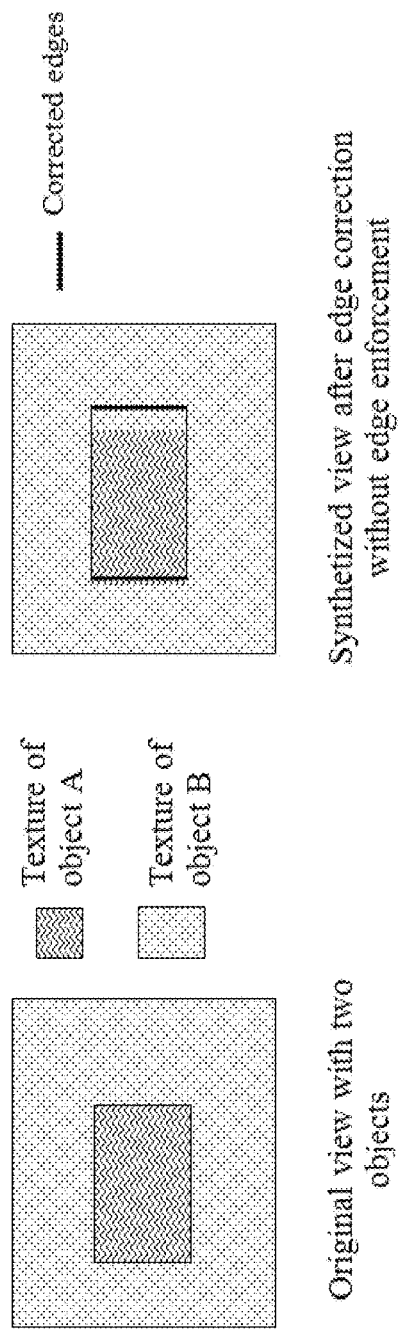
FIG. 10 shows an example of how the displacement of the altered edges can cause visual artifacts due to the discontinuity introduced in adjacent areas.
Figure 11:
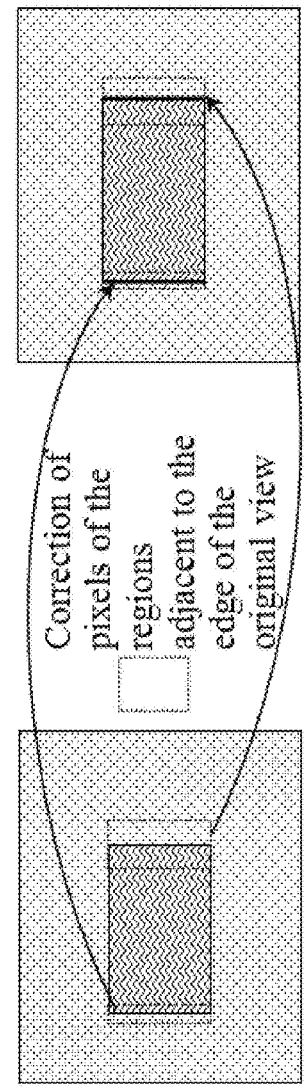
FIG. 11 shows an example of correction of pixels of adjacent areas.

Thanks to this feature the selection of the threshold $\gamma$ is not critical and can be used only as a mean to reduce the complexity of the whole algorithms steps, spending the computational effort only on edges that underwent significant warping errors and that have a major impact on the visual quality. FIG. 10 shows an example of correction applied to a miswarped edge.

1.3.2 Correction by Smoothing

This method is closely related to the definition of the edge error based on anomaly detection (see Sect. 1.2.2). In this case we aim at correcting the edge by smoothing those parts of the edge trajectory that have been recognized as anomalous. If gradient is used to detect anomalies one can use a smoothing filter e.g., average filter or non-linear median filter on $\tilde{V}_j(i)$ in order to regularize its values.

In the case of horizontal camera setup only the column coordinate needs to be corrected; as a consequence in the following example we omit the row index for simplicity.

Let us define as $\overline{\tilde{V}_j^c}$ the gradient of the warped edges at the output of any smoothing operator.

The correct location of the i-th edge point can be approximated by setting $$\hat{v}_{j,i} = \begin{cases} \hat{v}_{j,i} & \text{if the } i\text{-th point is correct} \\ \hat{v}_{j,i-1} + \overline{\tilde{v}}_j^c & \text{otherwise} \end{cases}$$

Figure 2A:
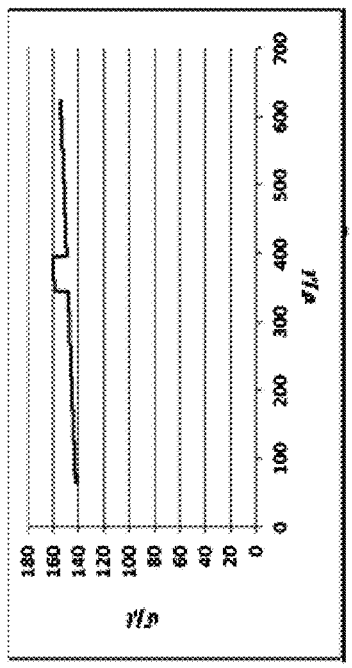
FIGS. 2a-f show examples of edge error detection and correction using 'Edge Gradient', more in particular.
Figure 2B:
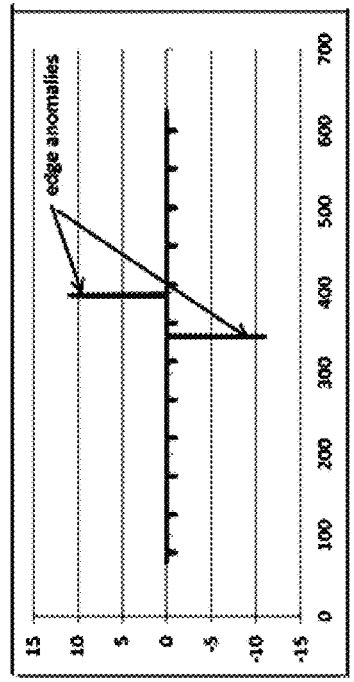
Figure 2C:
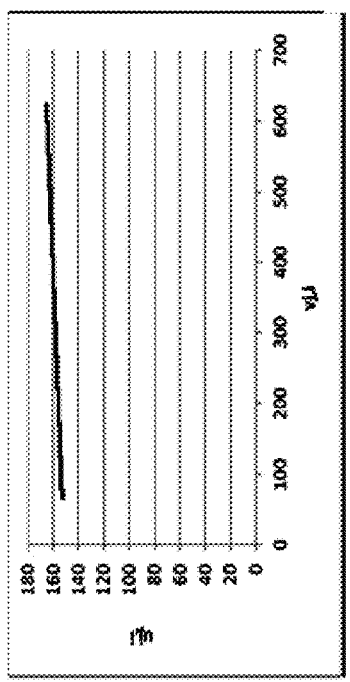
Figure 2D:
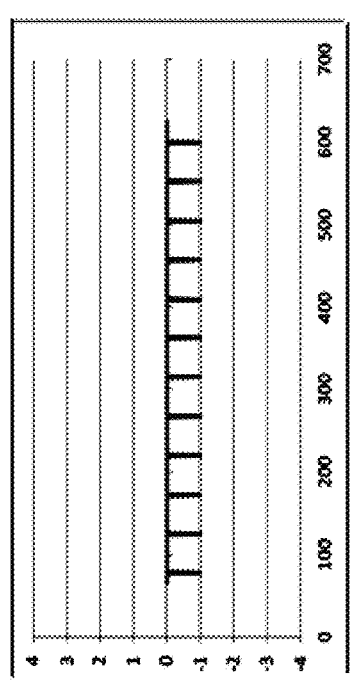
Figure 2E:
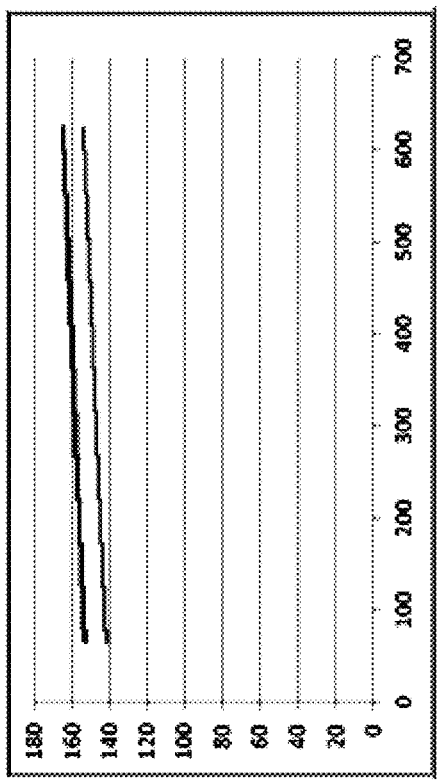
Figure 2F:
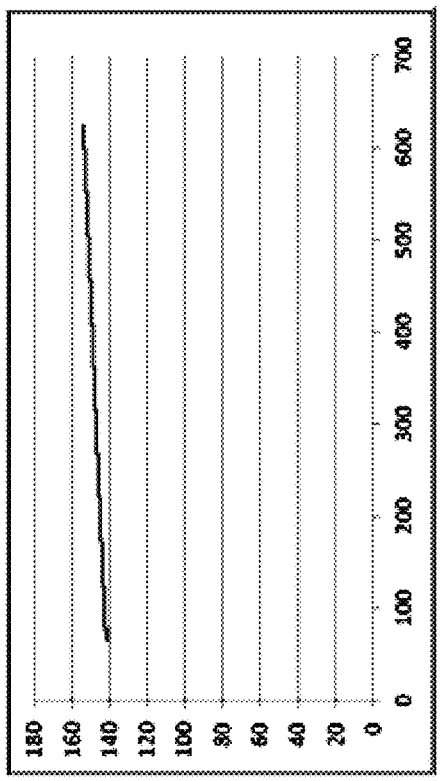

FIG. 2d shows two anomalies in the gradient of the warped edge; by using a smoothing operator one can cancel the abrupt spikes in the gradient and using previous formula the corrected edge in FIG. 2e is obtained. In FIG. 2f the corrected edge (lower curve) is compared with the corresponding edge before warping (upper curve).

1.3.3 Correction by Reference

This correction method is based on the assumption that the gradient of the edge is almost preserved after warping.

In this light, to correct the location of i-th point of an altered edge $\tilde{e}_j$ one corrects the anomalous values of the warped gradient according to the gradient of the original edge $e_j$. Given the selected i-th point of the edge, its corrected location is estimated by applying the gradient of the original edge to the preceding edge point or by using some function of its neighborhood as shown below:

$$\hat{e}_j(i) = \tilde{e}_j(i-1) + V_j(i)$$

Another possibility is to use a more general operator $$\hat{e}_j(i) = \tilde{e}_j(i-1) + \mathcal{F}(N_H(V_j(i)))$$

where $N_H(.)$ is neighborhood of size H of the i-th edge point and $\mathcal{F}()$ is a suitable function.

Since usually the warping error affects a consecutive set of edge points, erroneous point identification and correction by reference can be applied recursively. In a first round erroneous point are located and corrected and then the process is iterated until no more errors exceeding a given value can be detected along the edge.

Figure 1H:
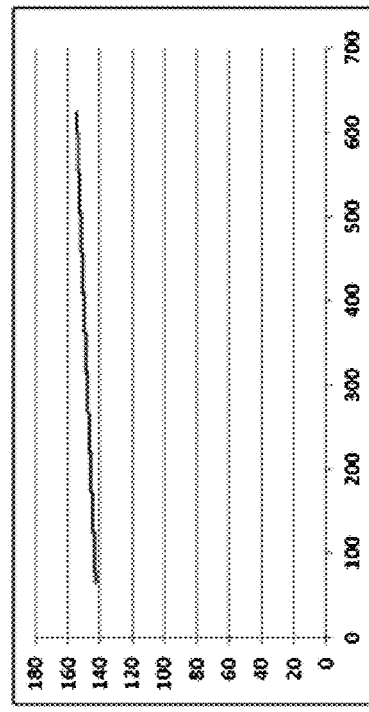
FIG. 1h Original edge (upper curve) and corrected warped edge (lower curve)

All the proposed correction approaches are able to improve the edge quality in terms of the proposed error metric, as shown in FIG. 1h where the values of the metric before and after the correction are reported for a given frame of a test sequence.

Figure 3:
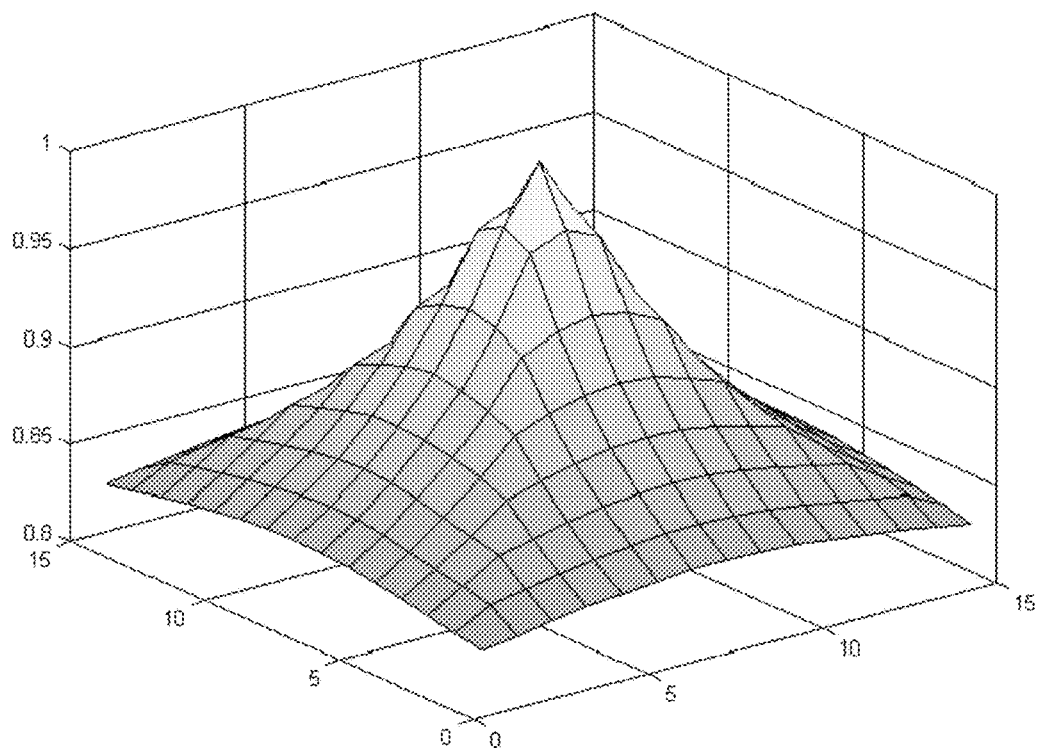
FIG. 3 shows an example of proposed weighting kernel w(u,v) with k=7 and ρ=0.8.

The described algorithmic steps are represented visually in FIG. 3 where the edges E extracted from the left view (a), their warped counterparts $\tilde{E}$ (b) and their corrected profiles (c) are superimposed to a test image.

1.3 Edge Enforcement in the Virtual View

The corrected edges can be used to improve the quality of the rendered intermediate view by properly integrating the corrected edges with the surrounding pixels without introducing visual artifacts. Indeed previous algorithmic steps are used only to correct the edge's location without taking care of the edge's neighborhood. This stage is termed as Edge Enforcement and it can be achieved by using known image processing tools aiming at blending different areas of the picture.

A possible technique achieving this result, is to copy every corrected edges into the intermediate view with the corresponding k-neighbors on both edge sides (horizontally), i.e., image patches along the edge are blended so as to create the corresponding texture.

As an example, the neighboring pixels can be blended in the warped virtual view using weights that depends on the distance from the corrected edge. A weighting kernel w of size (2k+1)×(2k+1) is defined as:

$$w(u, v) = 1 - \frac{1}{\rho} 2\log(\sqrt{u^2 + v^2} + 1)$$

where ρ is a parameter representing a lower bound on the diffusion weight (0<ρ≤1). FIG. 3 shows an example of 15×15 (k=7) weighting kernel with ρ=0.8. The chosen size of the kernel depends on the value of k that represents a tunable parameter.

In the case edges are corrected from the original content view $V_l$ that is on the left with respect to the desired intermediate view $V_m$ (see FIGS. 5a, 5b, 5c), the edge enforcement stage takes as input the edge lists (E, Ẽ), the original left view $V_l$ and the warped intermediate view $V_m$ and outputs an edge enhanced intermediate view $V'_m$.

First of all, we initialize $V'_m = V_m$, then every edge point $e_j(i)$ is corrected by copying the corresponding point from $V_l$:

$$V'_m(\tilde{e}_j(i)) = V_l(e_j(i))$$

Blending of the area surrounding every edge point is performed by applying the following equation:

$$V'_m(\tilde{u}_{j,i}+x, \tilde{v}_{j,i}+y) = V_l(u_{j,i}+x, v_{j,i}+y)w(x,y) + V_m(\tilde{u}_{j,i}+x, \tilde{v}_{j,i}+y)(1-w(x,y))$$

for −k≤x≤k, −k≤y≤k, subject to $(\tilde{u}_{j,i}+x, \tilde{v}_{j,i}+y) \notin E$, the last check being used to avoid smoothing previously copied edge points).

1.4 Description of Embodiments

Figure 4:
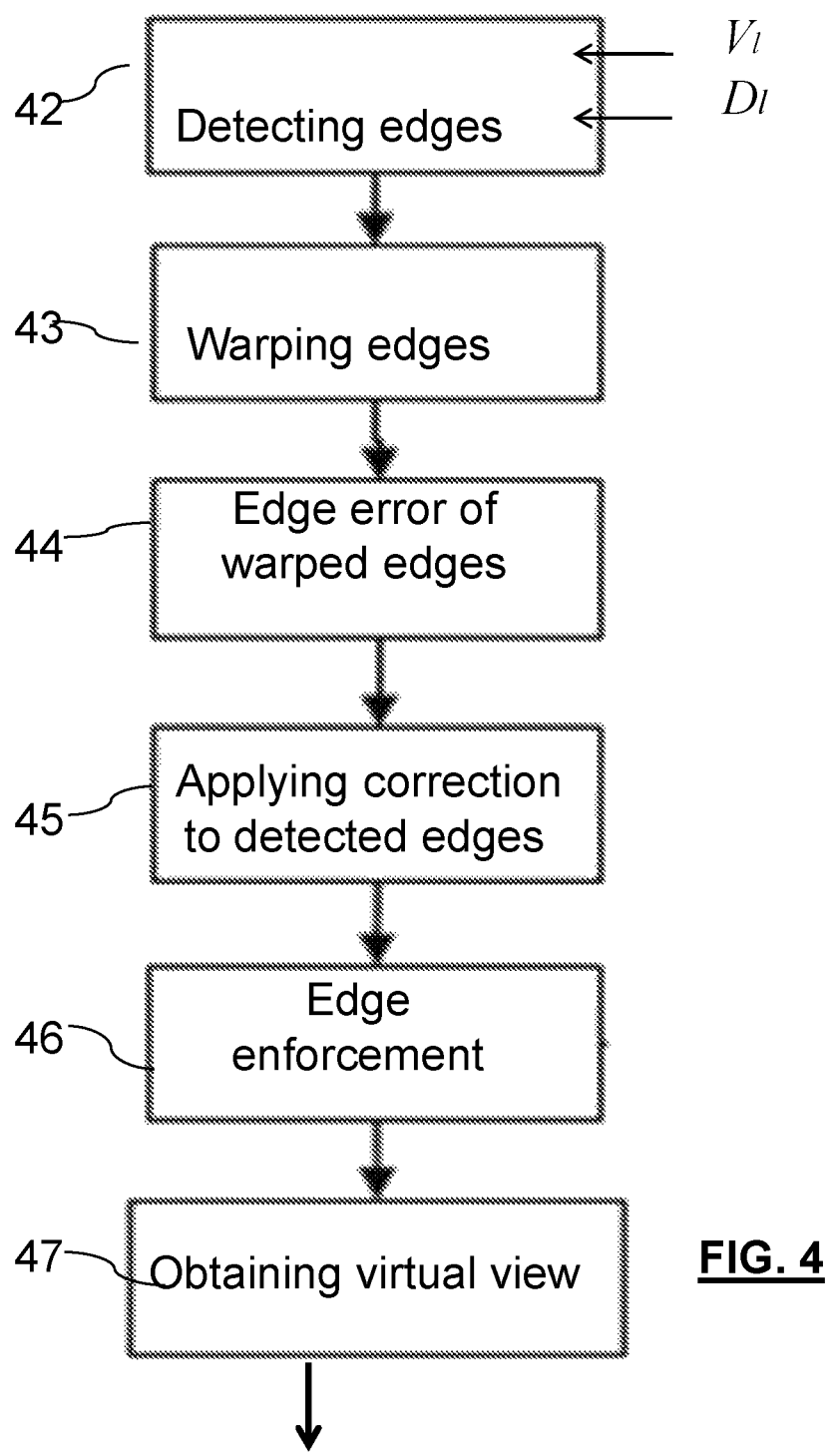
FIG. 4 shows a first example of block diagram of a circuit for the embodiment of the edge correction technique at the reconstruction side in the case of correction using one view.

FIG. 4 shows an example of block diagram of a circuit for the embodiment of the above described edge correction technique at the reconstruction side of a system for edge shape enforcement for visual enhancement of depth image based rendering of a three-dimensional video stream according to the invention.

Figures 5A, 5B, 5C:
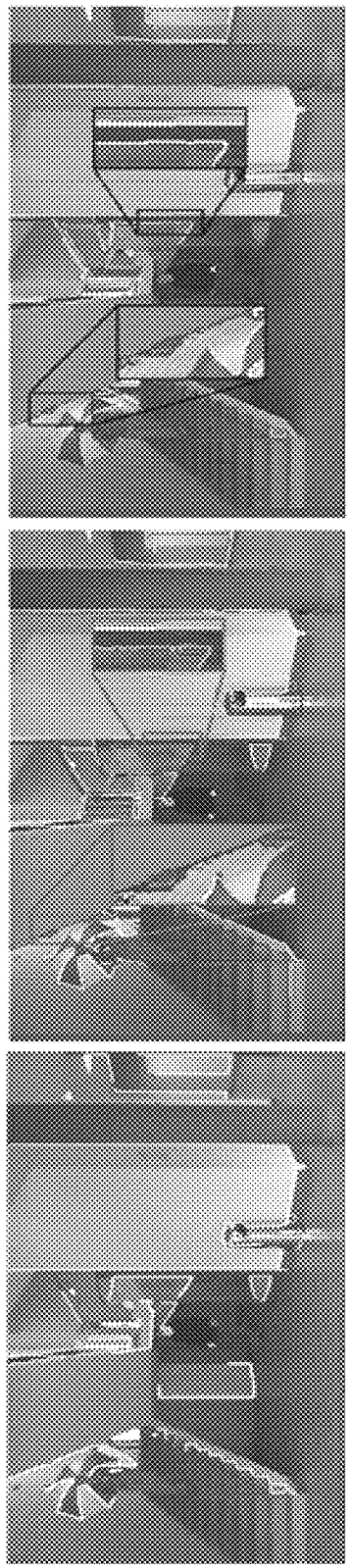
FIGS. 5a-c show three examples of images of edge correction operations, more in particular.

In the example edges are detected and corrected using only the left view, then the corrected edges are enforced in the intermediate view created by a standard depth based image rendering tool. As already stated it is convenient to detect the edge in the original content view but we do not exclude the possibility to perform the same operation using the depth map. FIGS. 5a to 5c show the most important algorithmic steps on an actual image; namely, edges extracted from left view (FIG. 5a), warped image with altered edges (FIG. 5b), and the warped image with corrected edge locations (FIG. 5c) are shown.

In FIG. 4 the left view $V_l$ and associated depth map $D_l$, are processed in block 42 to detect the edges of the depth map. Then the detected edges are warped in block 43. The following block 44 computes the edge error of the warped edges. In the following block 45 the relevant correction is applied to the detected edges, and then the edge enforcement is also applied to the relevant edges (block 46). Finally the virtual view corresponding to the relevant depth map is obtained (block 47). It is therefore possible to obtain corrected images of said three-dimensional video content, by applying said corrected edges on the images of said video content.

Figure 6:
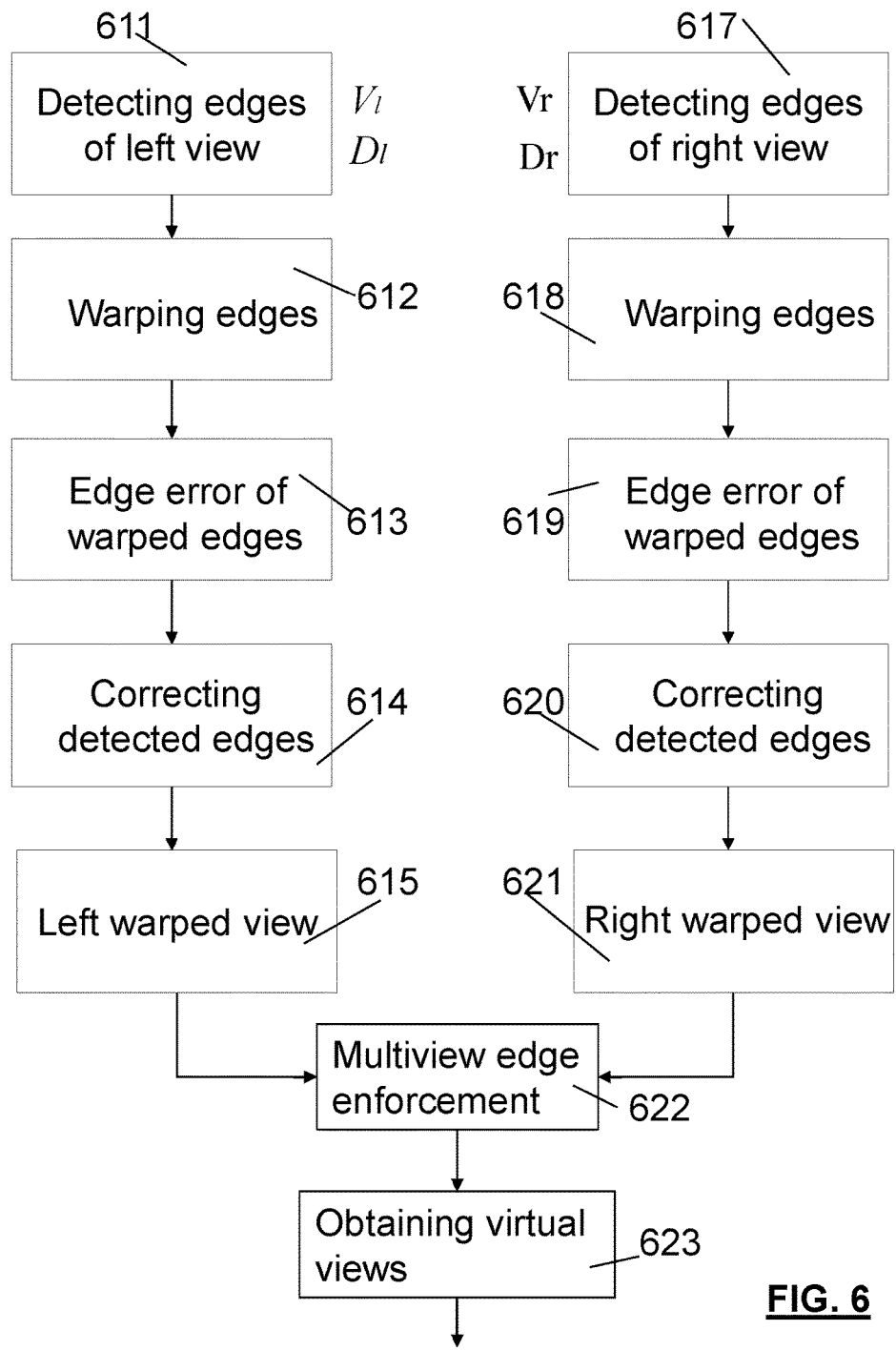
FIG. 6 shows a second example of block diagram of a circuit for the embodiment of the edge correction technique at the reconstruction side in the case of edge enforcement by using two views and depth.

FIG. 6 shows another example of block diagram of a circuit for the embodiment of the edge correction technique at the reconstruction side of a system for edge shape enforcement for visual enhancement of depth image based rendering of a three-dimensional video stream according to the invention.

In this embodiment detection and correction of edges is performed on both the closest views and/or corresponding depth of the three-dimensional video stream.

The left view $V_l$ and associated depth map $D_l$, are processed in block 611 to detect the edges. Then the detected edges are warped in block 612. The following block 613 computes the edge error of the warped edges. In the following block 614 the relevant correction is applied to the detected edges to get a left warped view with corrected edges (block 615).

Similarly the right view $V_r$ and associated depth map $D_r$, are processed in block 617 to detect the edges. Then the detected edges are warped in block 618. The following block 619 computes the edge error. In the following block 620 the relevant correction is applied to the detected edges to get a right warped view with corrected edges (block 621).

After correction, correspondence between the edges is computed: correction may be applied in a number of ways by a slightly more complex edge enforcement block 622, with respect to block 46 of FIG. 4, applying a Multiview Edge Enforcement. Such block supplementary uses at least one of the following techniques to jointly enforce edges corrected from one left and one right view:

all edges (from left and from right) are corrected sequentially and independently; this solution is the simplest but the same edge can be corrected twice.

first all edges are corrected by one view and then only the edges that have not been corrected before are processed thanks to the second view for those edges that exhibit possible correction from both the left and the right view the best correction according to a certain criterion can be applied; e.g., the correction yielding the least warping error according to them metric proposed in this patent can be selected.

The edges that can be corrected only from one view are corrected as in the previous embodiment.

The final virtual view is then obtained (block 623).

It is therefore possible to obtain corrected images of said three-dimensional video content, by applying said corrected edges on the images of said video content.

Figure 12:
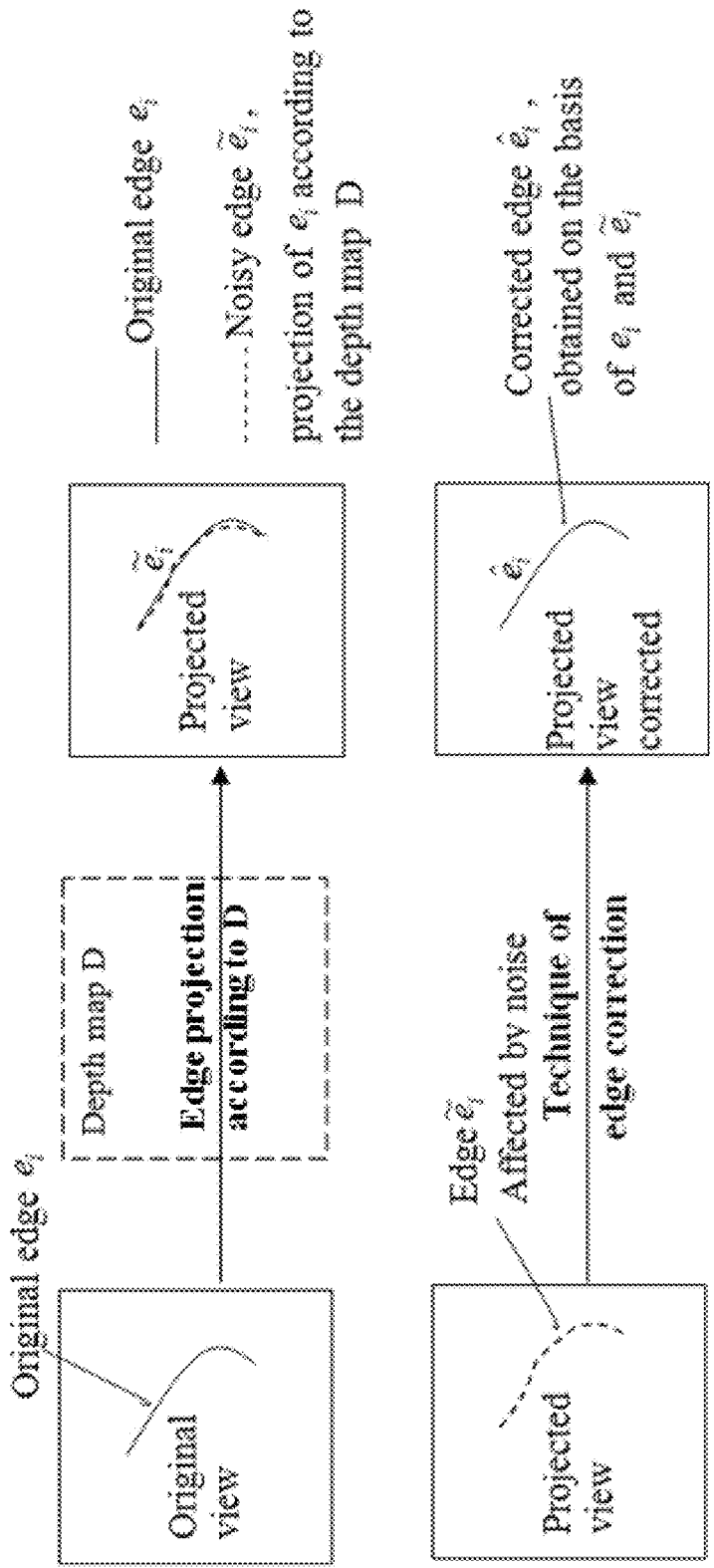
FIG. 12 shows an example of diagram of edge correction procedure in reconstruction.

FIG. 12 summarizes the whole procedure of edge correction performed at the reconstruction side of the system.

Figure 13:
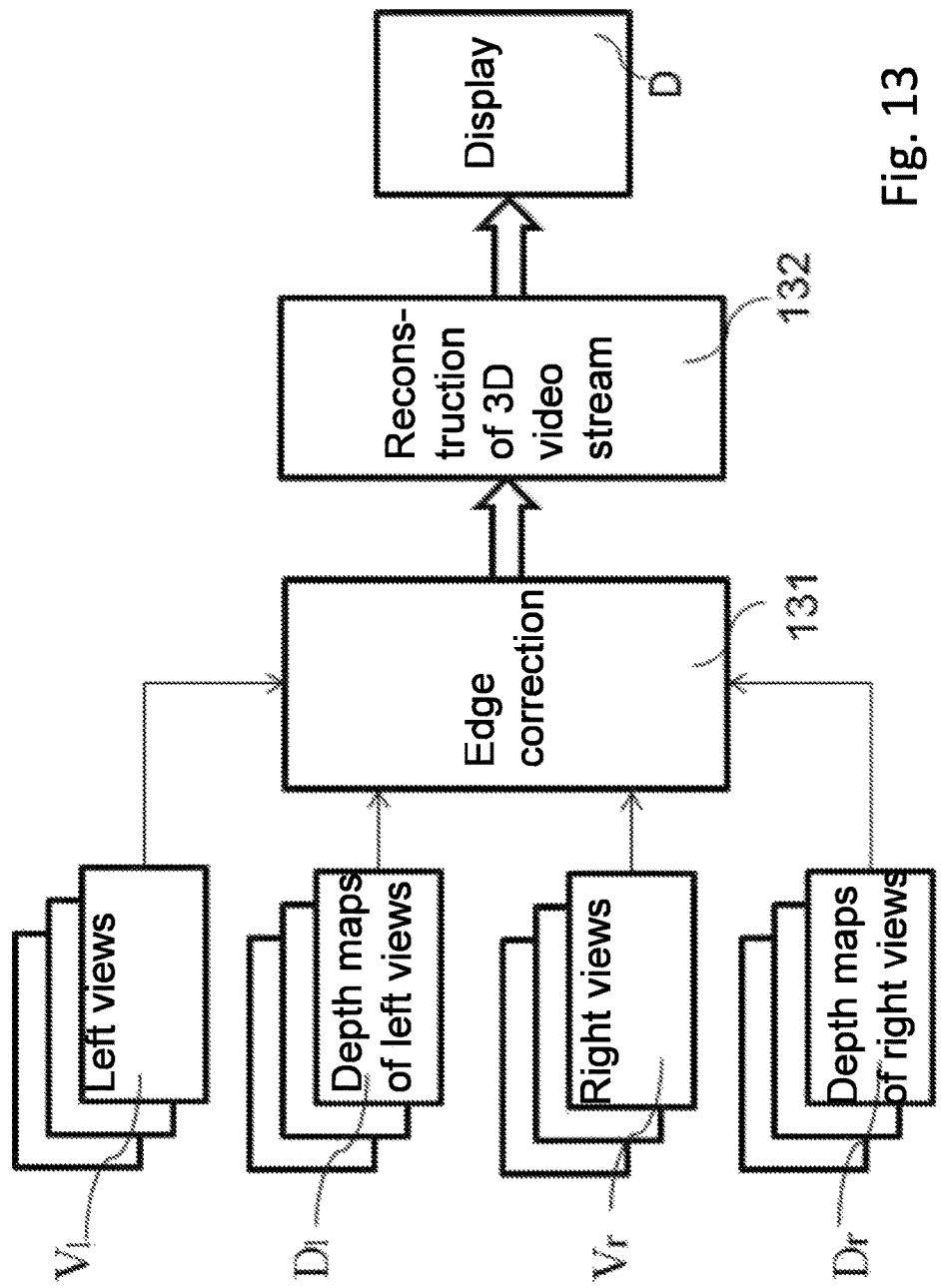
FIG. 13 shows an example of block diagram of a receiving system for a three-dimensional video stream, including a circuit as from FIG. 4 or 6.

FIG. 13 shows an example of block diagram of a receiving system for a three-dimensional video stream, including a circuit 131 for the embodiment of the edge correction technique at the reconstruction side according to the invention. It is recognized that the skilled in the art does not have any problem in inserting the circuit of the invention in such a receiving system, which is embodied in a way per se known, once aware of the teaching of the invention.

The circuit 131 can be implemented as described above, with reference to FIG. 4 or 6. It receives at the inputs the left $V_l$ and right $V_r$ views of the three-dimensional video stream, with associated depth (or disparity) maps $D_l$ and $D_r$ respectively, which are reconstructed in any known way per se, for example starting from a three-dimensional video composite stream received at the input.

The circuit 131 comprises means for performing the above described edge correction technique, and supplies at the output the final virtual view with corrected depth maps and left $V_l$ and right $V_r$ views.

The streams of left $V_l$ and right $V_r$ views and relating depth maps are supplied to a block 132 comprising means for the reconstruction of the three-dimensional video stream to be supplied to a display D or to be stored for subsequent use.

The receiving system of FIG. 13 is adapted to reconstruct a video stream of a number of possible kinds, depending on the type of display D.

In the case of a 2D display, the receiving system will simply discard the images $V_r$ and the depth maps and will display, subject to possible scaling, only the sequence of images $V_l$ on the display D.

The same applies in the case of a 3D display in which the user has activated the 2D display mode, if available.

In the case of a 3D display in which the 3D display mode has been activated, the system will use the left $V_l$ and right $V_r$ views and relating corrected depth maps to build up a three-dimensional video image.

The system is also adapted to generate a three-dimensional video image for a self-stereoscopic display, which needs a very large number of views (for example a few tens) to generate the three-dimensional effect for viewers positioned at different points in the space in front of the display. In this case, the block 131 will use the depth maps and the left $V_l$ and right $V_r$ views to synthesize a series of other images suitable for the self-stereoscopic display.

2 Sender Side Correction

As already mentioned, edge correction can be exploited on the transmitter (generation) side of the three-dimensional video system, to improve the quality of depth maps. This can be achieved by recovering the correct depth value for the corrected edges based on the shift correction that they require. This approach can be used as post processing to improve the depth map or integrated in a depth estimation technique. The mathematical details are provided in the following.

2.1 Depth Correction

In this case depth values of the edge points that undergo warping error are corrected so as to render (by means of standard DIBR) the objects contour correctly. In order to apply such correction to a depth map prior to transmission, we compute some extra information based on edge warping. As in previous cases first of all the edges can be detected from at least one view. Then, all edge points are warped in a virtual view using DIBR techniques and miswarped edges are recognized with the error criteria described above. Then, we correct the depth values associated to the miswarped edge points. The process is based on the algorithm steps described in the following.

2.1.1 Shift Map Computation

After edges detection in at least one view as described in Section 1.1, the edge list E is warped to the virtual camera resulting in warped edge list Ẽ. While warping each edge we compute the shift of each edge pixel $(u_{j,i}, v_{j,i})$. Let $e_j$ be the j-th edge and $e_j(i)$ be its i-th point, more specifically, $e_j(i)$ as described in the previous sections.

Let $d_j(i)$ be the corresponding depth of edge pixel $e_j(i)$. Assuming horizontal camera setup, for each edge pixel $e_j(i)$, we compute its shift $\delta_j(i)$ as follows:

$$\delta_j(i) = \pm \frac{bf}{2d_j(i)}$$

The sign of the shift depends on the warping direction, e.g., it is positive when warping the original view to the left and negative when warping to the right. The shifts of all the edge points are termed in the following as shift map.

This shift is added to the horizontal coordinate of each pixel $v_{j,i}$ to compute its warped position $\tilde{v}_{j,i}$.

The next step is to find the miswarped edges and this is done in the same way as described in Section 1.2.

2.1.2 Depth Map Correction

Every miswarped edge $\tilde{e}_j(i)$ can be corrected as described earlier getting the corrected edge $\hat{e}_j(i)$. The correction algorithm modifies the column coordinate of the erroneous edge pixels. We can compute the correction in terms of shift error as follows:

$$\bar{\delta}_j(i) = \tilde{e}_j(i) - \hat{e}_j(i)$$

The shift map of the edge can be corrected taking into account the shift error due to correction, getting the corrected shift map as follows:

$$\hat{\delta}_j(i) = \delta_j(i) - \bar{\delta}_j(i)$$

Once the shift map is corrected, we use the warping formula to correct the corresponding depth associated to the original view inverting the equation $$\delta = \frac{bf}{2d}$$

where d is the depth of the pixel being warped. We use the corrected shift to compute the corresponding correct depth as follows $$\hat{d}_j(i) = \frac{bf}{2\hat{\delta}_j(i)}$$

Once the depth of the edge is corrected, the depth of the neighboring pixels of every edge must be corrected in order to avoid artifacts. This goal can be achieved by using known depth interpolation algorithms or any other known image processing tool aiming at blending different areas of the images while masking visual artifacts.

As an example the Edge Enforcement step previously described can be easily adapted to perform the same task on a depth map.

2.2 Examples of Embodiments

Figure 7:
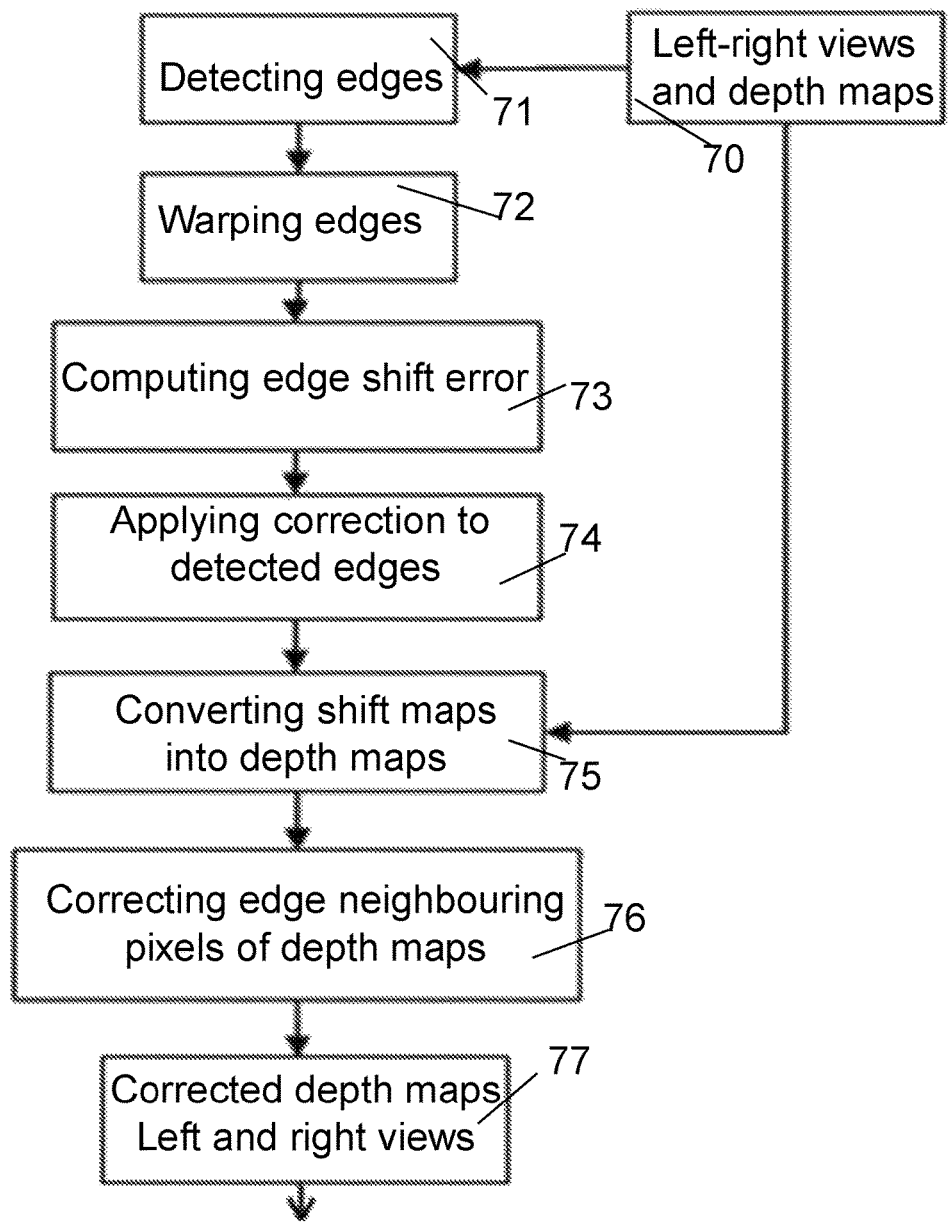
FIG. 7 shows a first example of block diagram of a circuit for the embodiment of the edge correction technique at the generation side in the case of depth correction using single view plus depth.

FIG. 7 shows an example of block diagram of a circuit for the embodiment of the above described edge correction technique at the transmitter (generation) side of a system for edge shape enforcement for visual enhancement of depth image based rendering of a three-dimensional video stream according to the invention. In this embodiment the depth correction is achieved using a single view.

The edges are detected in the view and then warped to a virtual position. Edge error is computed implementing the aforementioned methods and correction is applied implementing techniques described in section 2.1. This only corrects the edges; to correct the edge neighboring depth pixels any suitable interpolation method can be applied.

In FIG. 7 the left or right view and associated depth map or disparity map (block 70) are processed in block 71 to detect the edges. Then the detected edges are warped in block 72. The following block 73 computes the edge shift error of the warped edges. In the following block 74 the relevant edge shift correction is applied to the detected edges of the shift map. In block 75 the obtained shift map is converted into a corresponding depth map using also the left view and associated depth map from block 70. Then in block 76 the edge neighboring pixels of the depth map are corrected, obtaining the corrected depth map of the left or right view (block 77).

Figure 8:
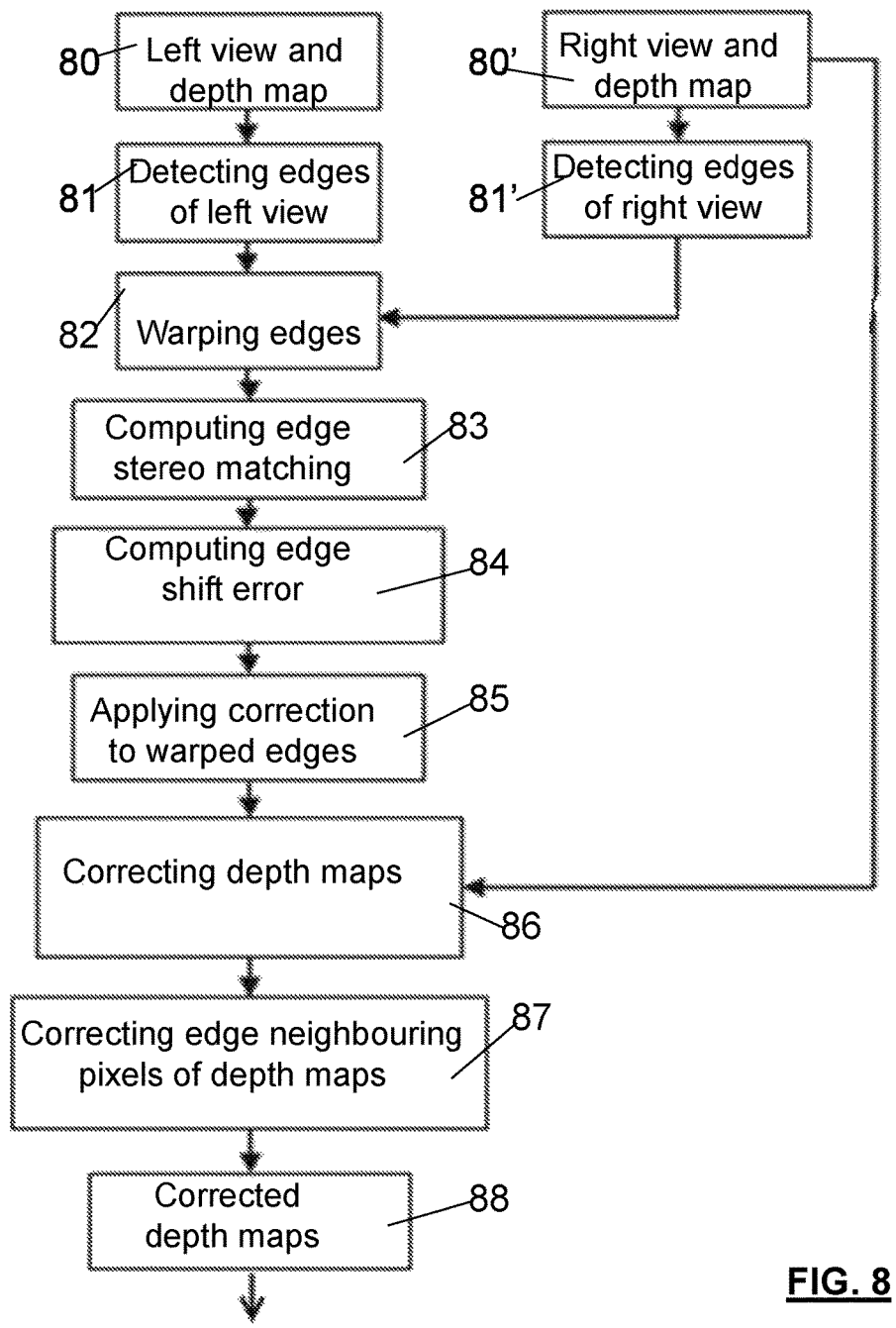
FIG. 8 shows a second example of block diagram of a circuit for the embodiment of the edge correction technique at the reconstruction side in the case of depth correction using multiple views plus depth.
Figure 9:
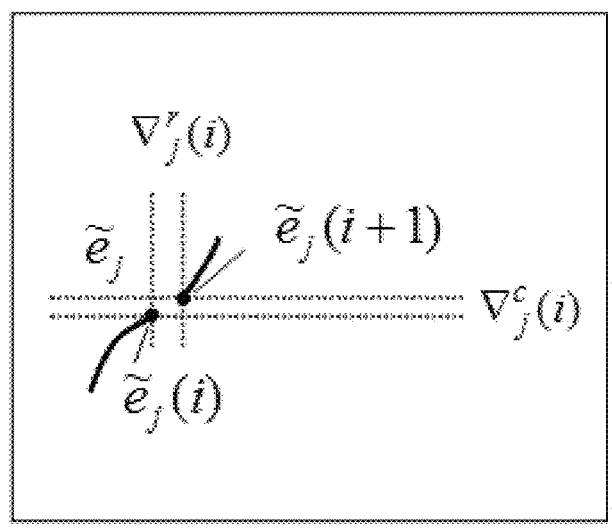
FIG. 9 shows an example of discontinuous edge $\tilde{e}_j$ of the i-th pixel with horizontal and vertical gradient in modulus >1.

FIG. 8 shows another example of block diagram of a circuit for the embodiment of the above described edge correction technique at the transmitter (generation) side of a system for edge shape enforcement for visual enhancement of depth image based rendering of a three-dimensional video stream according to the invention. In this further embodiment the proposed warping error metrics are used to compare the edge detected in one original view, say left view, with respect to the edge available in another original view, say, the right view. Let $E_l$ be the set of edges detected in the left view and $E_r$ be the set of edges detected in the right view. Each edge $e_j \in E_l$ is warped to the right view giving us the set of warped edges $\tilde{E}_l$, $\tilde{e}_{l,j}$ being the j-th warped edge.

After warping the edges $E_l$ to the right view, we establish a correspondence between the edges $\tilde{E}_l$ and $E_r$ using suitable known stereo matching tools.

Let for an edge $\tilde{e}_{j,l} \in \tilde{E}_l$, the corresponding edge in $E_r$ be $e_{r,k}$.

In other words it is possible to define a mapping function m(.) such that m(j)=k, i.e., the j-th left warped edge matches the k-th edge detected in the right view.

A subset of edges may be chosen for correction based on at least one of the criteria discussed in Sect. 1.1. Moreover, it is possible that an edge in $E_l$ does not have a corresponding edge in $E_r$ due to occlusions or edge detection issues (the edges in disoccluded region of left view would not be present in the right view, or the corresponding edges in the right view are too weak to be detected by the edge detection method and hence the correspondence may not be established). Such edges may be dropped from the possible correction candidates.

Once a stereo correspondence between the edges is established, the warping error is detected by using the metrics described earlier and correction may be applied evaluating those metrics.

As an example shape matching can be defined between the warped left edge and the corresponding right edge by computing $$\psi_j(i) = e_{r,m(j)}^r(i) - \tilde{e}_{l,j}^r(i)$$

i.e., the same metric proposed in Sect. 1.2.1 is reused to spot the differences between the referenced right edge and the corresponding referenced warped left edge.

Analogously anomaly detection approach presented in Sect. 1.2.2 can be used to detect anomalous points of a given warped left edge by taking the corresponding right edge as a reference.

According to the approach presented in Sect. 2.1.2 we can compute the shift-error:

$$\tilde{\delta}_j(i) = \tilde{e}_{l,j}(i) - e_{r,m(j)}(i) = -\psi_j(i)$$

The shift error $\tilde{\delta}_j(i)$ is then used to correct the corresponding depth map as described in section 2.1.2. By interchanging the roles of left and right views, the aforementioned approach can be used to remove depth anomalies in the right view.

In FIG. 8, showing the block diagram of depth correction using multiple views, the left view $V_l$ and associated depth (or disparity) map $D_l$ (block 80) are processed in block 81 to detect the edges of said left view. Then the detected edges are warped in block 82. The right view $V_r$ and associated depth (or disparity) map $D_r$ (block 80') are processed in block 81' to detect the edges of said right view.

In the following block 83 the edge stereo matching is computed between the edges of the left and right views.

In the following block 84, for each pair of edges the edge shift error is calculated. Then in block 85 the corresponding shift correction is applied to the warped edges, and in block 86 the corrected shifts are used to correct the corresponding depth map of the left view. Then in block 87 the edge neighboring pixels of the depth map are corrected, obtaining the corrected depth map of the left view (block 88). As said above, the same can be obtained for the depth map of the right view.

It is to be noted that the procedure described above can be applied to any pair of views and corresponding depth map, and therefore can be extended to a general multi-view and corresponding depth map settings provided that it is applied iteratively to different pair of views/depths to progressively refine the depth values.

In another embodiment one of the previous approaches can be implemented as a part of a depth estimation algorithm to help this latter return improved depth result or converge faster to the desired depth values.

Figure 14:
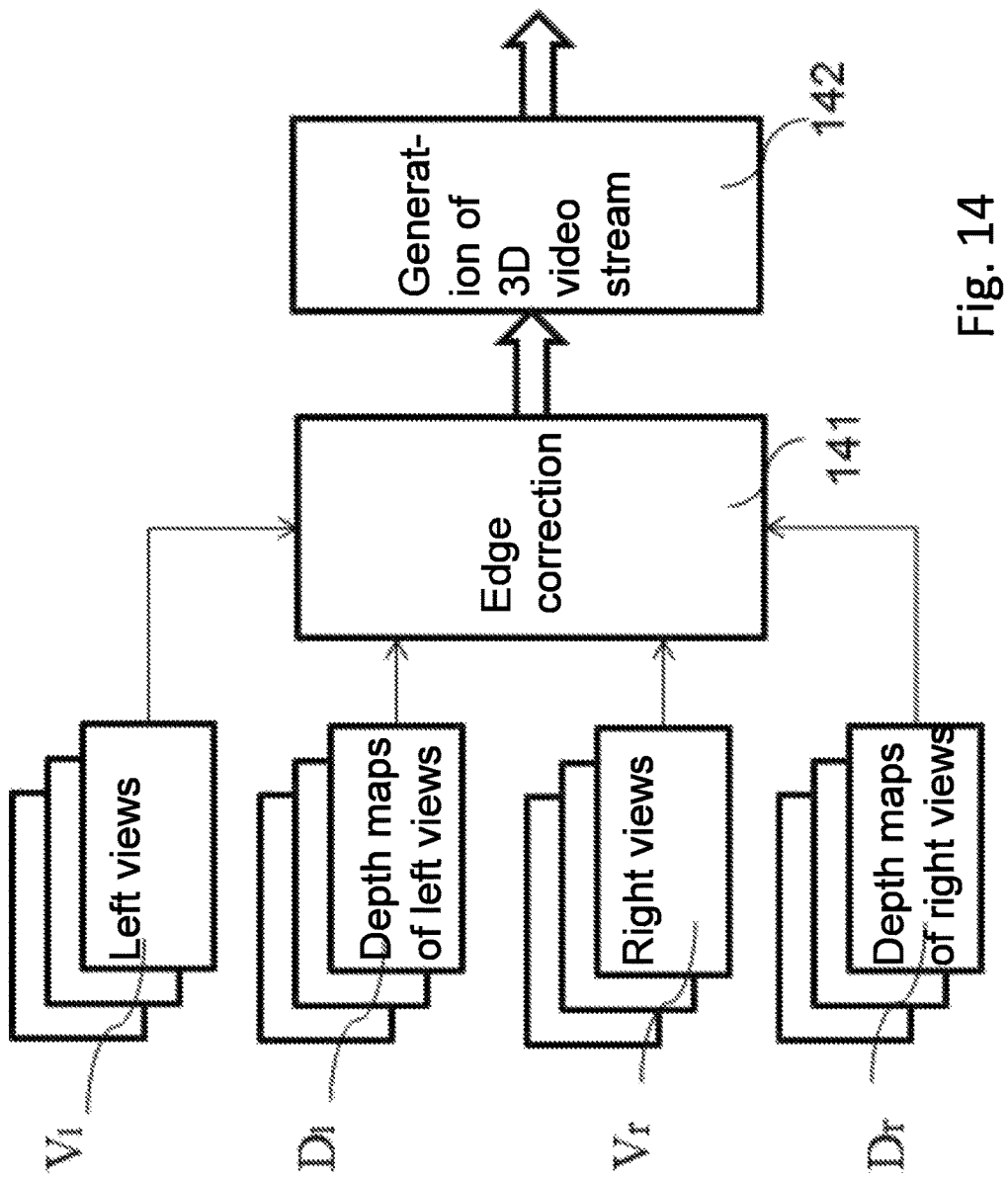
FIG. 14 shows an example of block diagram of a transmitting system for a three-dimensional video stream, including a circuit as from FIG. 7 or 8.

FIG. 14 shows an example of block diagram of a generating system for a three-dimensional video stream, including a circuit 141 for the embodiment of the edge correction technique at the transmission (generation) side according to the invention. It is recognized that the skilled in the art does not have any problem in inserting the circuit of the invention in such a generating system, which is embodied in a way per se known, once aware of the teaching of the invention.

The circuit 141 can be implemented as described above, with reference to FIG. 7 or 8. It receives at the inputs the left $V_l$ and right $V_r$ views of the three-dimensional video stream, with associated depth (or disparity) maps $D_l$ and $D_r$, respectively, which are generated in any known way per se.

The circuit 141 comprises means for performing the above described edge correction technique, and supplies at the output the corrected depth maps with edge shape enforcement, of the left $V_l$ and right $V_r$ views respectively.

The streams of left $V_l$ and right $V_r$ views and relating corrected depth maps are supplied to a block 142 comprising means for the generation of a three-dimensional video stream, which can be supplied to a transmission system or stored for subsequent use.

3 Method and Apparatus for Depth Quality Assessment

Usually the quality of depth estimation is assessed by generating a virtual view from two views and depths and virtual view is then compared with the corresponding original.

Quality metrics like Peak Signal to Noise Ratio (PSNR), Structural Similarity Index Measure (SSIM) and Video Quality Assessment (VQA) are often used to measure the quality of the two images.

There are cases where this approach fails because the intermediate view original reference is missing since it has not been acquired at shooting time. Even when the original intermediate view is available the generation of a full intermediate view by means of DIBR may impose a very high computational burden on the quality assessment tool.

Finally, the existing depth quality assessment methods work in case of two views with corresponding depth maps.

On the contrary, the proposed depth quality assessment methods are more general and can be used to measure the quality even of a single depth with respective view. In such a case a single view can be warped to an arbitrary view-point and depth error can be computed using the methods described in the following.

It is well known that edges contribute significantly to the subjective image quality. In particular, accurate and precise warping of edges is an important feature to guarantee high quality virtual images.

The proposed edge warping error metrics can be used for this purpose as well, independently from their usage in a three-dimensional edge correction technique. In the following some examples of global edge warping error metrics are defined; nonetheless alternative metrics can be defined based on the edge error metrics defined in Sect. 1.2.1 and 1.2.2. In the following two metrics for depth quality assessment based on our edge error computation methods are exemplified.

3.1 Absolute Warping Edge (AWE) Error Metric

The simplest way to compute the depth quality is to detect the edges, the major visual attribute for human visual system (HVS), warp the edges to a virtual position and compute the error induced by depth errors in each edge.

The sum of absolute error of all the edges in a frame indicates the error in the depth.

As a consequence we define the Absolute Warping Edge (AWE) error metric $\Delta_k$, that represents the total edge warping error in a given frame k:

$\Delta_k = \Sigma_{j \in E_k} |\mu_j|$ where $\mu_j$ is the error of edge j and $E_k$ is the set of all the edges in frame k.

Clearly, such metric can be used to rank the quality of a whole video sequence by applying a proper statistical operator to the series of metric values computed on every frame and view, e.g. averaging, maximum, etc.

3.2 Weighted Warping Edge (WWE) Error

Method described above to measure the depth quality may be sensitive to large error in small edges that might not significantly affect the visual quality of the virtual view. To make the error metric more robust, one can balance the edge error depending on the length. A Weighted Warping Edge Error (WWE) can be defined as follows:

$$\ddot{\mu}_j = \mu_j w(n_j)$$

where the error of the j-th edge is weighted according to a function $w(n_j)$ depending on the edge length $n_j$. Such function is used to weight more the error in long edges. Then the metric $\Delta_k$ is defined as:

$$\Delta_k = \sum_{j \in E_k} |\ddot{\mu}_J|$$

The method of the present invention can be advantageously implemented at least in part through programs for computer comprising program coding means for the implementation of one or more steps of the method, when these programs are running on a computer. Therefore, it is understood that the scope of protection is extended to such programs for computer and in addition to a computer readable means having a recorded message therein, said computer readable means comprising program coding means for the implementation of one or more steps of the method, when this program is run on a computer.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the scope of the invention are deemed to be covered by this invention.

The elements and characteristics described in the various forms of preferred embodiments can be mutually combined without departing from the scope of the invention.

Further implementation details will not be described, as the man skilled in the art is able to carry out the invention starting from the teaching of the above description.

The invention claimed is:

1. A method for edge correction of images of a three-dimensional video content, said video content comprising at least one original view image and at least one depth or disparity map, the method comprising the following steps:
    detecting edges in said at least one original view image to obtain original edges;
    warping said original edges according to said depth or disparity map, to obtain warped edges;
    detecting a set of said warped edges altered by the warping process that produces altered edges, due to errors or inaccuracies in said depth or disparity map used by said warping process; and
    correcting said altered edges to obtain corrected edges;
    wherein said step of detecting said set of warped edges comprises a step of an edge shape matching by comparing an original edge and a corresponding warped edge and determining a distortion in the warped edge with respect to the original edge,
    wherein said step of correcting said altered edges comprises determining a function of gradient values of the original edges in a vicinity of the warped edge, the gradient representing horizontal and vertical increments of an edge trajectory,
    wherein said function of the gradient values of the original edges is a sum of coordinates of a pixel preceding a pixel of the warped edge and the gradient calculated at corresponding pixels of a projected edge.

2. The method as in claim 1, wherein said determining a distortion in the warped edge with respect to the original edge comprises:
    computing a reference edge point as the centroid of the horizontal and vertical coordinates of the warped edges and the original edges, or as the median of the horizontal and vertical coordinates of the warped edges and the original edges;

expressing the coordinates of the original and warped edge with respect to the corresponding reference point, obtaining the referenced edge points; and computing a warping error for each point of the edge by taking the difference between the coordinates of the referenced edge points before and after warping.

3. The method as in claim 1, wherein said step of detecting the set of warped edges comprises a step of anomalies detection on warped edge coordinates by:

performing a comparison of the shape of the edge trajectories before and after warping looking for anomalous modifications of the gradient of edges before and after warping by computing the difference of the horizontal and/or vertical gradient of the edges before and after warping;

said horizontal or vertical gradient representing respectively increments of the horizontal and vertical coordinates of the edge trajectory.

4. The method as in claim 3, wherein the modification of said gradient is considered an anomalous modification if the warped edge is disconnected around the considered edge point.

5. The method as in claim 3, wherein said steps of correcting said altered edges comprises correcting the edge by a smoothing process of those parts of the edge trajectory that have been recognized as anomalous.

6. The method as in claim 5, wherein it comprises using a smoothing filter, or average filter or non-linear median filter for said correction.

7. A method for assessing the quality of a depth map corresponding to an original view related to a three-dimensional video content comprising:

applying a method according to claim 3 to the edges of an original view pertaining to said three-dimensional video content for obtaining corresponding horizontal and/or vertical gradient differences of the edges before and after warping, and summing up the absolute values of said gradient differences resulting for said edges warped in accordance with said depth map.

8. The method as in claim 1, wherein said step of correcting said altered edges comprises correcting the shape of the warped edges by subtracting from the warped edge the edge error as the deviation detected between the original edge and the corresponding warped edge to enforce the shape of the original edge.

9. The method as in claim 8, wherein the correction is applied only to those edges whose overall error defined as the overall deviation detected between the original edge and the corresponding warped edge is above a threshold.

10. The method according to claim 1, wherein the step of warping the original edges is performed on a subset of the detected edges depending on at least one of the following factors:

quality criteria to be achieved within the whole correction process, visual quality or specific properties of the visual objects or geometrical properties or application specific constraints;

geometrical features of the edge, including one or more of an orientation, linearity, curvature, and length of the edge;

edge-based position, including one or more of a position in 3D space, or a closeness to the camera viewpoint.

11. The method as in claim 1, wherein said steps of correcting said altered edges comprises modifying a location of a pixel of an altered edge by correcting the anomalous values of the gradient of the warped edge according to the gradient of the original edge to the preceding edge pixel or its neighborhood.

12. The method as in claim 11, wherein said correcting the anomalous values of the gradient of the warped edge is applied recursively.

13. The method as in claim 1, wherein the corrected edges are contained in a warped view image obtained by warping the at least one original view according to the depth or disparity map.

14. The method as in claim 13, further comprising a step of edge enforcement, wherein further values of pixels located in proximity of the original edge corresponding to the warped edges are blended in said warped view in proximity of said corrected edges.

15. The method as in claim 1, further comprising the step of detecting edges in another original view image of the three-dimensional video content for obtaining edges detected in said other view, wherein:

the step of detecting the set of warped edges altered by the warping process comprises matching said warped edges and the edges detected in said other view for individuating their correspondence to the same edge of the three-dimensional video content and measuring the alteration produced by the warping process by comparing said warped edges and the edges detected in said other view, and the step of correcting said altered edges depends on said edges detected in said other view and on said measuring.

16. A method for edge correction of images of a three-dimensional video content, said video content comprising at least two original view images and at least two depth or disparity maps, the process comprising:

performing the method according to claim 1 to one of said at least two original views and to the other of said at least two original views;

wherein said method is performed on said original views consecutively one after the other and independently from each other.

17. A method for edge correction of images of a three-dimensional video content, said video content comprising at least two original view images and at least two depth or disparity maps, the process comprising:

performing the method according to claim 1 to one of said at least two original views and to the edges of the other said at least two original views.

18. The method according to claim 1, further comprising the steps of:

determining the depth of said warped edges in the correspondent depth map;

calculating shifts caused by the warping process on said warped edges with respect to the original edges by exploiting the relationship among depth and disparity values of the edge pixels;

measuring a shift error produced by the warping process with respect to said original edges;

determining a correct shift value of the edges basing on said shift errors and said shifts; and determining a correct depth value of said altered edges by exploiting the relationship among depth and disparity values of the edge pixels.

19. The method as in claim 18, wherein the depth of the neighboring pixels are interpolated by using a depth interpolation algorithm.

20. The method according to claim 1, further comprising the step of obtaining corrected images of said three-dimensional video content, by applying said corrected edges on the images of said video content.

21. The method according to claim 20, wherein said step of obtaining corrected images comprises summing pixel values of said altered edges weighted by a weight factor depending on the length of the edge to which the pixels of the sum pertain.

22. A method for assessing the quality of a depth map corresponding to an original view related to a three-dimensional video content comprising:
applying a method according to claim 1 to the edges of an original view image pertaining to said three-dimensional video content for obtaining respectively corresponding edge distortions and warping errors, and
summing up respectively said distortions or warping errors resulting for said edges warped according to said depth map.

23. Video quality assessment apparatus, comprising:
an edge correction circuit comprising:
an input unit receiving at least one original view image and at least one depth or disparity map, and
an image processing unit performing a method according to claim 22.

24. A non-transitory computer readable medium having executable programming instructions stored thereon, said computer readable medium comprising computer program code means adapted to perform all the steps of claim 1, when said programming instructions are run on a computer.

25. A video processing apparatus, comprising:
an edge correction circuit comprising:
an input unit receiving at least one original view image and at least one depth or disparity map, and
image processing unit performing a method according to claim 1.

26. The method as in claim 1, wherein said distortion is determined by analyzing the gradient of edges before and after warping.

27. The method as in claim 1, wherein said distortion is assessed to be present in an edge if at least one of the horizontal and vertical gradients of said edge is greater than a predetermined value.

* * * * *